US012748081B2

(12) United States Patent
Haywood et al.

(10) Patent No.: US 12,748,081 B2
(45) Date of Patent: Sep. 29, 2026

(54) HEAT EXCHANGER STATE SENSING APPARATUS AND METHOD OF USE THEREOF

(71) Applicants: James W. Haywood, Boerne, TX (US); Mike Hollingshaus, Livermore, CA (US); Mark Amato, S. Hamilton, MA (US); W. Davis Lee, Rockport, ME (US)

(72) Inventors: James W. Haywood, Boerne, TX (US); Mike Hollingshaus, Livermore, CA (US); Mark Amato, S. Hamilton, MA (US); W. Davis Lee, Rockport, ME (US)

( * ) Notice: Subject to any disclaimer, the term of this patent is extended or adjusted under 35 U.S.C. 154(b) by 370 days.

(21) Appl. No.: 18/424,032

(22) Filed: Jan. 26, 2024

(65) Prior Publication Data

US 2024/0345034 A1 Oct. 17, 2024

Related U.S. Application Data

(63) Continuation-in-part of application No. 18/422,711, filed on Jan. 25, 2024, now Pat. No. 12,656,319, (Continued)

(51) Int. Cl.
*G01N 29/24* (2006.01)
*G01N 29/22* (2006.01)
(Continued)

(52) U.S. Cl.
CPC ....... *G01N 29/2481* (2013.01); *G01N 29/223* (2013.01); *G01N 29/225* (2013.01);
(Continued)

(58) Field of Classification Search
CPC ............. G01N 29/2481; G01N 29/223; G01N 29/225; G01N 29/2437; G01N 29/265;
(Continued)

(56) References Cited

U.S. PATENT DOCUMENTS

2018/0178256 A1* 6/2018 Donovan ............. G01N 29/265
2020/0363147 A1* 11/2020 Hæggström .............. F28G 7/00

FOREIGN PATENT DOCUMENTS

WO WO-2018004350 A1 * 1/2018 ............. F28G 15/08

* cited by examiner

*Primary Examiner* — Nathaniel T Woodward
(74) *Attorney, Agent, or Firm* — Kevin H. Hazen; Hazen Patent Group, LLC

(57) ABSTRACT

The invention comprises a method and apparatus for sensing state of a heat exchanger, comprising the steps of: providing the heat exchanger, the heat exchanger comprising a set of heat exchange pipes at least partially inserted into a housing of the heat exchanger; providing a heat exchange state model; detecting first signals passing through a first portion of the heat exchanger with a first ultrasonic sensor; detecting second signals passing through a second portion of the heat exchanger with a second ultrasonic sensor; and at least one of the steps of: (1) training the heat exchange state model with the first signals and the second signals; and (2) receiving output from the heat exchange state model, the heat exchanger state model previously trained with the first signals and the second signals.

18 Claims, 35 Drawing Sheets

Related U.S. Application Data which is a continuation of application No. 18/376,616, filed on Oct. 4, 2023.

(60) Provisional application No. 63/620,040, filed on Jan. 11, 2024, provisional application No. 63/455,764, filed on Mar. 30, 2023.

(51) Int. Cl.
*G01N 29/265* (2006.01)
*G01N 29/07* (2006.01)

(52) U.S. Cl.
CPC ....... *G01N 29/2437* (2013.01); *G01N 29/265* (2013.01); *G01N 29/07* (2013.01); *G01N 2291/02854* (2013.01); *G01N 2291/0289* (2013.01); *G01N 2291/106* (2013.01); *G01N 2291/2634* (2013.01)

(58) Field of Classification Search
CPC ......... G01N 29/07; G01N 2291/02854; G01N 2291/0289; G01N 2291/106; G01N 2291/2634; G01N 29/043; G01N 29/4481
USPC ............................................................ 73/592
See application file for complete search history.

HEAT EXCHANGER STATE SENSING APPARATUS AND METHOD OF USE THEREOF

CROSS-REFERENCES TO RELATED APPLICATIONS

This application is a continuation-in-part of U.S. patent application Ser. No. 18/422,711 filed Jan. 25, 2024, which is a continuation-in-part of U.S. patent application Ser. No. 18/376,616 filed Oct. 4, 2023, which claims benefit of U.S. provisional patent application No. 63/455,764 filed Mar. 30, 2023; and claims benefit of U.S. provisional patent application No. 63/620,040 filed Jan. 11, 2024, all of which is incorporated herein in its entirety by this reference thereto.

BACKGROUND OF THE INVENTION

Field of the Invention

The invention relates generally to monitoring and/or cleaning heat exchangers.

Discussion of the Prior Art

Problem

There exists in the art a need for a monitoring state of and/or cleaning heat exchangers.

SUMMARY OF THE INVENTION

The invention comprises a heat exchanger monitoring/cleaning apparatus and method of use thereof.

DESCRIPTION OF THE FIGURES

A more complete understanding of the present invention is derived by referring to the detailed description and claims when considered in connection with the Figures, wherein like reference numbers refer to similar items throughout the Figures.

Elements and steps in the figures are illustrated for simplicity and clarity and have not necessarily been rendered according to any particular sequence. For example, steps that are performed concurrently or in different order are illustrated in the figures to help improve understanding of embodiments of the present invention.

DETAILED DESCRIPTION OF THE INVENTION

The invention comprises a method and apparatus for sensing state of a heat exchanger, comprising the steps of: providing the heat exchanger, the heat exchanger comprising a set of heat exchange pipes at least partially inserted into a housing of the heat exchanger; providing a heat exchange state model; detecting first signals passing through a first portion of the heat exchanger with a first ultrasonic sensor; detecting second signals passing through a second portion of the heat exchanger with a second ultrasonic sensor; and at least one of the steps of: (1) training the heat exchange state model with the first signals and the second signals; and (2) receiving output from the heat exchange state model, the heat exchanger state model previously trained with the first signals and the second signals.

Herein, an x-axis is along the length of a pipe, and a y/z-plane is perpendicular to the x-axis, such as a cross-section of the pipe.

Herein, for clarity of presentation and without loss of generality, an ultrasonic sensor is used as an example of a sensor and/or as an example of an ultrasonic transducer.

Herein, a heat exchanger contains one or more pipes and/or one or more tubes. For clarity of presentation and without loss of generality, the heat exchanger and/or pipes therein is used as an example of any pipe and the word tube is optionally used to refer to any pipe of a set of heat exchange pipes in the heat exchanger.

Heat Exchanger System

Figure 1:
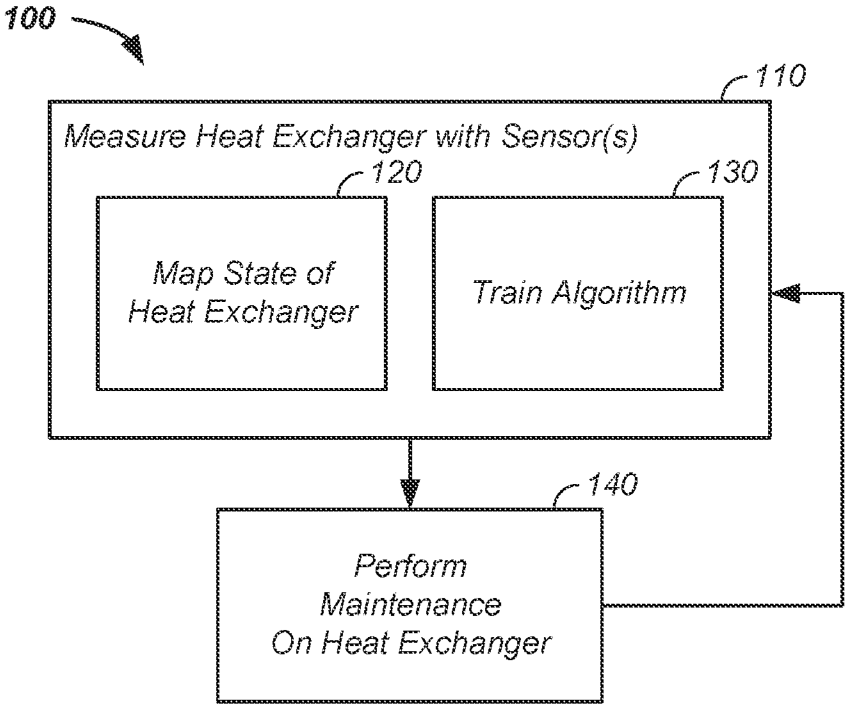
FIG. 1 illustrates a process for mapping state of a pipe/heat exchanger.

Referring now to FIG. 1, a method for heat exchanger state sensing and maintenance 100 is described. Generally, in a first process, a heat exchanger is measured with sensors 110. More particularly, state of the heat exchanger is mapped 120 and the state map, such as a set of sensor readings, is used to train an algorithm 130, such as via development of a model. In a second process, heat exchanger maintenance is performed 140, such as by following output suggestions of the model. The processes of training heat exchanger algorithms/systems and use of the algorithms/systems is further described herein.

Heat Exchanger

Generally, a heat exchanger is a system used to transfer heat between a source fluid and a working fluid. Heat exchangers are optionally used in cooling and/or heating processes. Herein, the source fluid and the working fluid are separated by at least one solid wall. More preferably, the source fluid is in a large tube and the working fluid flows through a series of pipes within the large tube or vice-versa.

Figure 2:
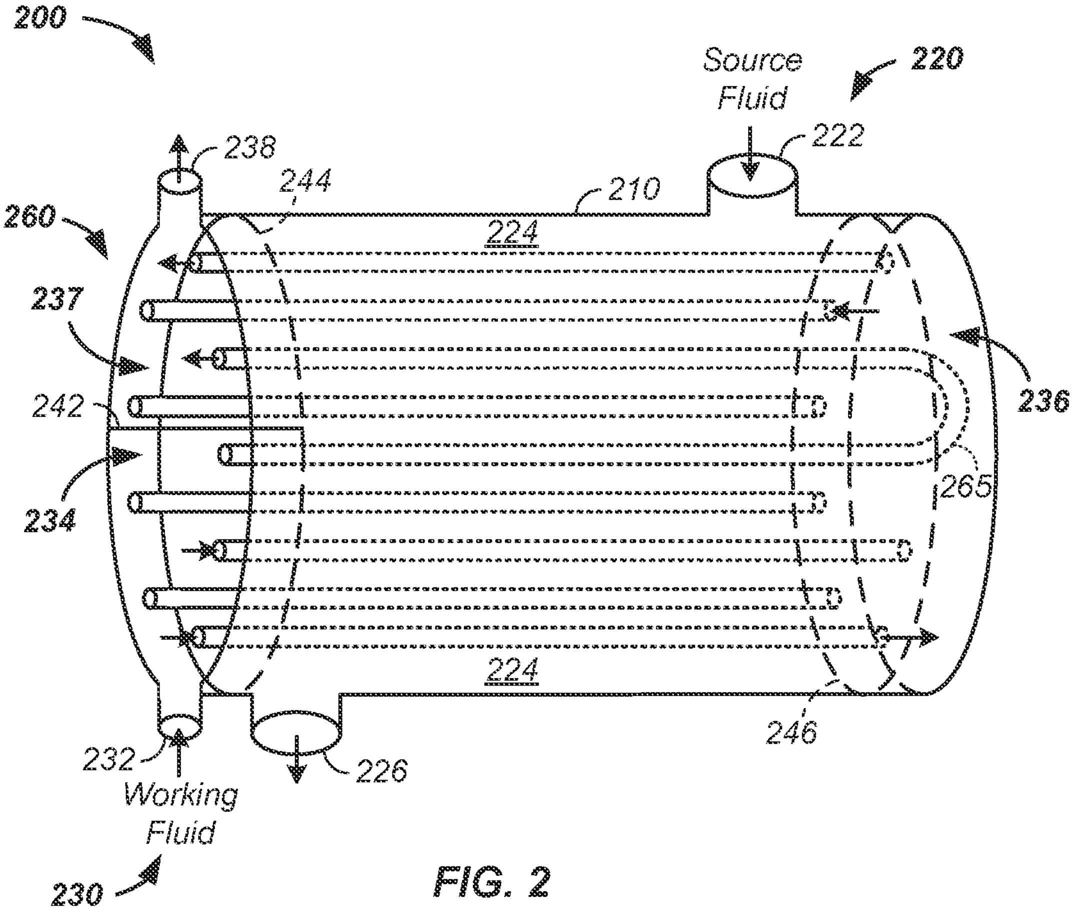
FIG. 2 illustrates a heat exchanger.

Referring now to FIG. 2, an exemplary heat exchanger 200 is illustrated. Herein, for clarity of presentation and without loss of generality, a tubular heat exchanger is used to illustrate any heat exchanger with separated source fluids and working fluids. The heat exchanger 100 contains a heat exchanger housing 210, main pipe, or container. A first fluid, which is either the source fluid or the working fluid, flows through a first path 220, such as through a first opening 222 into the main pipe 210, around at least one heat exchange pipe of a set of heat exchange pipes 260 carrying either the source fluid or the working fluid, through a main pipe chamber 224, and out a second opening 226. For clarity of presentation and without loss of generality, the first fluid is referred to herein as the source fluid. The working fluid flows through a second path 230, such as through a third opening 232, through the set of heat exchange pipes 260, and out a fourth opening 238. Generally, heat is exchanged from the source fluid to the working fluid or vice-versa through the walls of the set of heat exchange pipes 260. In addition to walls of the set of heat exchange pipes 260, optionally other walls separate the source fluid from the working fluid. For instance, the working fluid optionally flows into a first chamber 234, functioning as a holding fluid of a manifold system, which is separated from a third chamber 237 by an optional manifold wall 242. Similarly, the first chamber 234 is optionally separated from the source fluid by a first end pipe cap 244 of the main pipe 210. Optionally, a second end pipe cap 246 of the main pipe 210 separates the source fluid from the working fluid in a second chamber 236 for cases where the working fluid flows through pipes configured in series. Optionally, the working fluid flows through one or more pipes with U-turns 265. Generally, the working fluid flows through the set of pipes 260, where the set of pipes 260 contains greater than 0, 1, 2, 3, 5, 10, 25, 50, 100, 250, or 500 pipes, where at least a majority of the set of pipes 260 pass, at least partially, pass through the main pipe 210.

Sensors

Generally, a force sensor generates a force wave that is sent along/into/through the heat exchanger 200 to another sensor and/or back to the original force wave generation sensor. Generally, any sensor or set of sensors that uses a propagating force wave along a section or piece of pipe falls into the category of a force sensor. Optionally, the force wave is photons.

Figure 3:
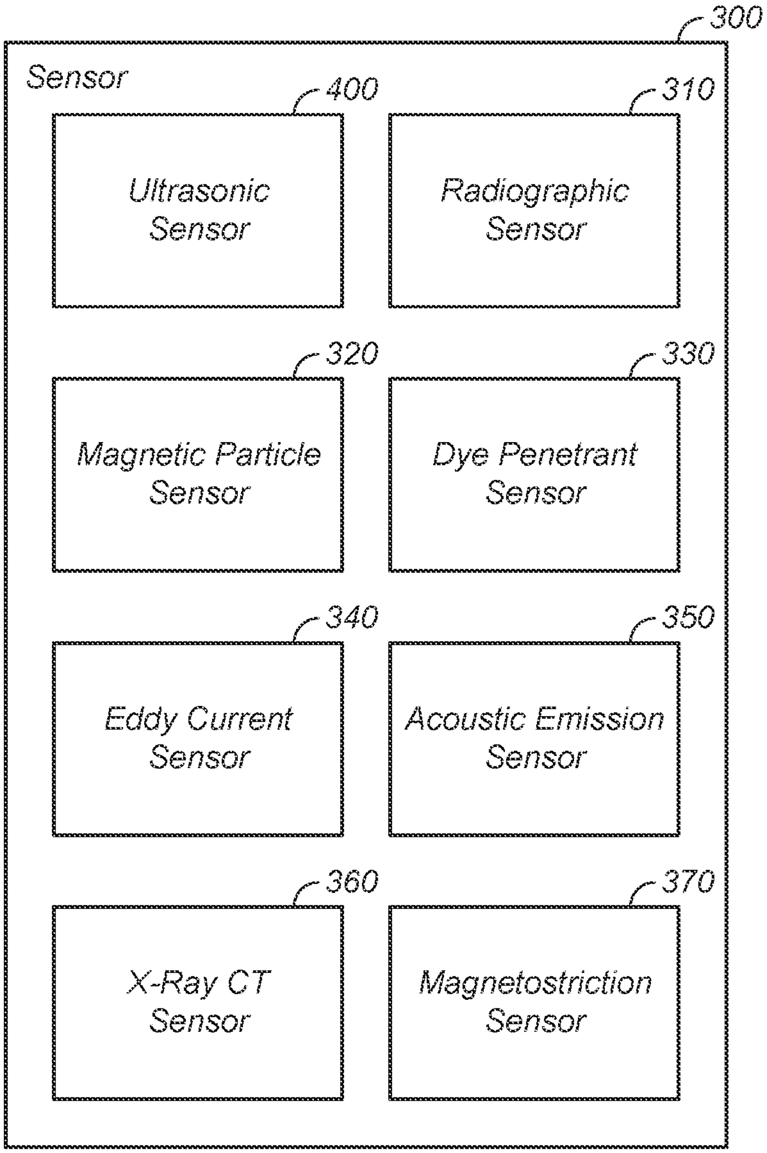
FIG. 3 illustrates sensor types.

Referring now to FIG. 3, one or more sensors 300 are used to measure state of the heat exchanger 200. FIG. 3 illustrates some exemplary pipe state sensors, such as an ultrasonic sensor 400, a radiographic sensor 310, a magnetic particle sensor 320, a dye penetrant sensor 330, an Eddy current sensor 340, an acoustic emission sensor 350, an X-ray CT sensor 360, and a magnetostriction sensor 370. Many more sensor types are optionally used, such as a simple thermometer, a force sensor, or even a balance. Herein, for clarity of presentation and without loss of generality, ultrasonic sensors 400 are used as an example of a pipe state sensor and/or a heat exchanger sensor. However, any other sensor type or combination of sensor types are optionally used to measure the pipe state, state of the heat exchanger 200, and/or any pipe and/or tube of the heat exchanger 200.

Ultrasonic Transducer/Sensor

Generally, the ultrasonic sensor 400 is optionally an ultrasonic transducer and/or a piezoelectric transducer, which is able to convert an electrical signal into mechanical vibrations and/or mechanical vibrations into an electrical signal. An ultrasonic sensor 400 is optionally viewed as a thickness gauge that measures precisely how long it takes for a sound wave caused by the ultrasonic sensor 400 to travel through a material to a sensor or to reflect off of a barrier in the material and travel back to the ultrasonic sensor 256. For clarity of presentation and without loss of generality, an example of the ultrasonic sensor 400 is provided, infra. Herein, the ultrasonic sensor 400 is optionally referred to as an ultrasonic transducer or vise-versa.

Example 1

Figure 4:
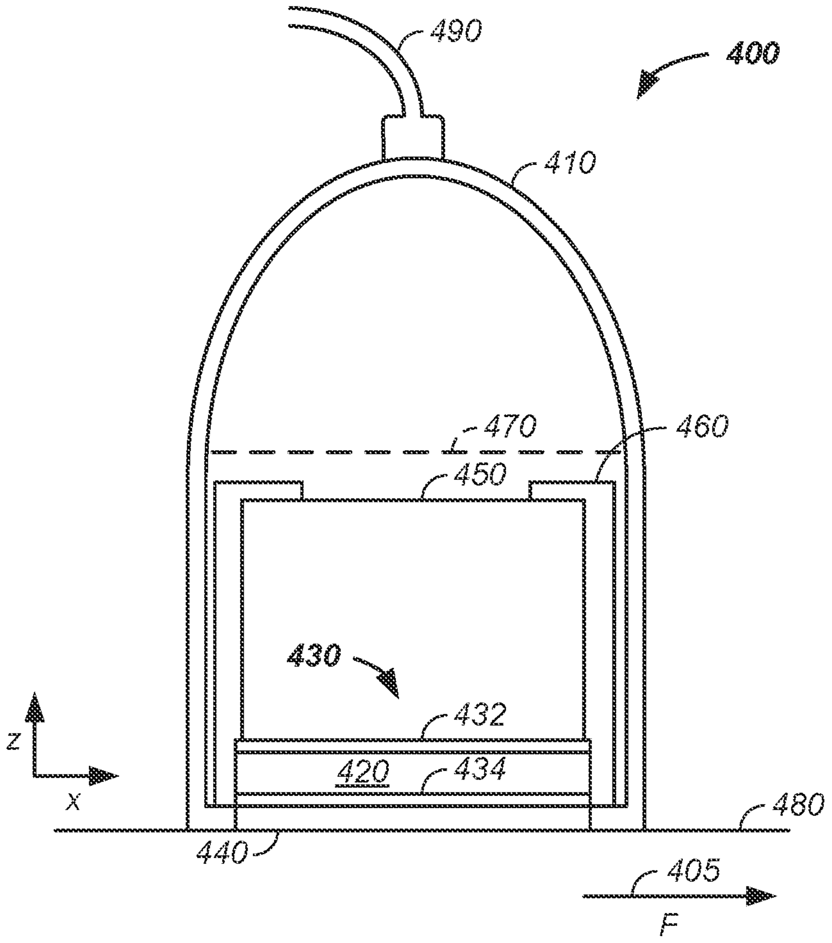
FIG. 4 illustrates an ultrasonic sensor/ultrasonic transducer.

Referring now to FIG. 4, an example of an ultrasonic sensor 400/ultrasonic transducer is illustrated for clarity of presentation and without loss of generality. The ultrasonic sensor 400 is representative of any ultrasonic sensor. As illustrated, the ultrasonic sensor 400 includes a housing 410, which houses a piezoelectric element 420 between a pair of electrodes 430, such as a positive electrode 432 and a ground electrode 434. A voltage, such as via a transducer lead 490, sent to the piezoelectric element deforms and/or changes the shape of the piezoelectric element and the resulting force is sent into the pipe, such as through an optional coupling element 440 and/or coupling fluid. An optional damping block 450 aids in directing the force changes into the heat exchanger 200 and/or any tube/pipe of the heat exchanger, such as any of the set of pipes 260, while an optional acoustic insulator 460 and/or metal shield 470 protects a user and/or reduces environmental effects, such as from sound and radio-frequency (RF) fields, respectively. A force sent into the heat exchanger 200 and/or any element of the set of heat exchange pipes 260 propagates across/through/along the pipe, such as via a force wave 405 sent along the pipe. The pipe optionally refers to any pipe element of the heat exchanger 200. Herein, the term "tube" is an optional use of the term pipe. Optionally, the ultrasonic sensor 400 functions as a transmitter and a second ultrasonic sensor functions as a receiver and/or the ultrasonic sensor 400 functions as a transmitter at a first moment in time and then as a receiver, such as when the force wave 405 reflects off of a surface, impefection, and/or joint, at second moment in time.

For clarity of presentation, operation of the ultrasonic transducer is used to illustrate propagation and detection of the force wave. However, the inventor notes that the ultrasonic transducer is representative of any force sensor. Multiple representative and non-limiting examples of paths of the force wave 405 and signals generated therefrom are provided, infra.

Figure 5:
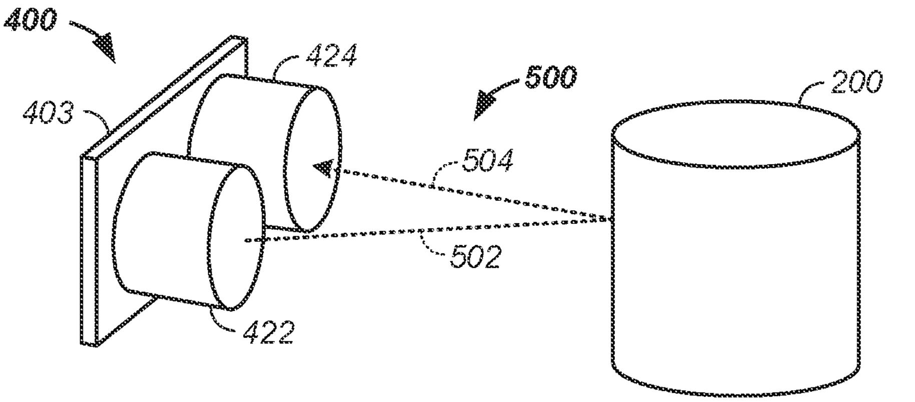
FIG. 5 illustrates an ultrasonic sensor and ultrasonic detector.

Referring now to FIG. 5, the ultrasonic sensor 400 is further described. While, a single transducer is optionally used to send a force wave and then detect the reflected force wave, the ultrasonic sensor 400 is optionally constructed with a transmission/transmitting section 422 and a detection/detecting section 424, each equipped with one or more of the components illustrated in FIG. 4. Optionally, a base plate 403 holds both the transmitting section 422 and the detecting section 424. Optionally, the ultrasonic sensor 400, the transmitting section 422, and/or the detecting section 424 are mounted with a physical connection and/or in direct contact (illustrated as separated for clarity of presentation) with any element of the heat exchanger 200 in known, fixed, and/or mobile positions, as further described infra. In use, the transmitting section 422 emits a probing force wave 502, which interacts with the heat exchanger 400, such as any pipe(s) or tube(s) of the heat exchanger 400. Various interactions with the heat exchanger alters the probing force wave 502 into a sensed force wave 504, which is subsequently sensed by the detecting section 424, such as at a separate location from the transmitting section, or at the source of the force wave when using an ultrasonic sensor configured to send and receive the probing force wave 502, referred to herein as a force wave, and the sensed force wave. For clarity of presentation, herein any use of the clauses ultrasonic sensor and/or ultrasonic transducer optionally use any number of transmitting sections and/or detecting sections and/or arrays of sensors.

Figure 6:
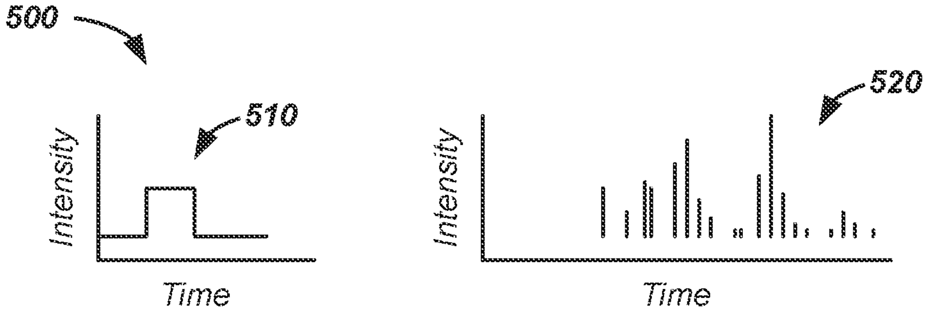
FIG. 6 illustrates chirps.

Referring now the FIG. 6, source and detected probe signals 500 of the ultrasonic sensor 400 are described. Optionally, the ultrasonic sensor 400 probes with a single ultrasonic frequency or small number of frequencies, such as greater than 1, 2, 5, or 10 frequencies. However, optionally and preferably, the ultrasonic sensor 400 probes with many frequencies, such as greater than 10, 25, 50, or 100 frequencies, such as by using a chirp 510 of multiple frequencies, such as where the probing signal increases or decreases with time, in one case forming a square wave pulse signal. Each ultrasonic frequency interacts with elements of the heat exchanger 200 differently, which results in differing detected travel times/travel time intensities 520 of the various chirp or source frequencies. All signals from all frequencies are referred to here as signals, intensities, and/or response signals.

Figure 7:
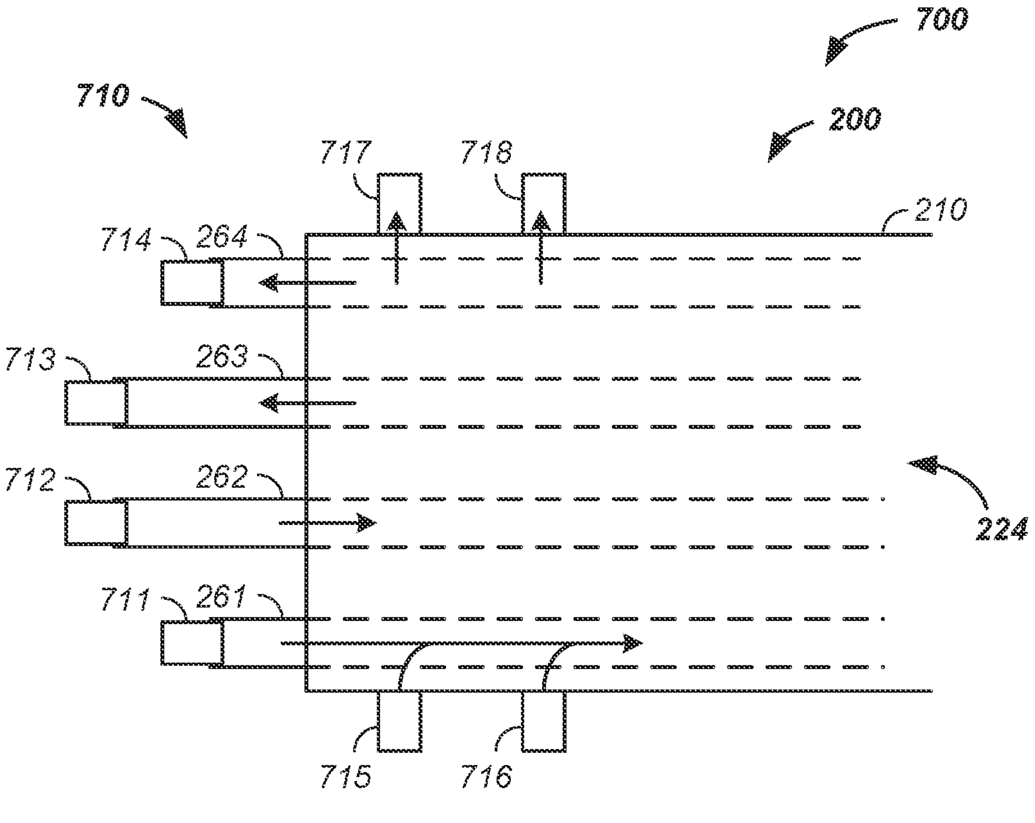
FIG. 7 illustrates ultrasonic sensor locations.

Referring now to FIG. 7, uses of multiple ultrasonic transducers 700 to sense states of the heat exchanger 200 are illustrated. Multiple examples are provided here for clarity of presentation and without loss of generality.

Example I

In a first example, a first ultrasonic sensor 711 is attached to an end of, is partially inserted into, or is inserted into a first heat exchange pipe 261 of the set of heat exchange pipes 260. The process is repeated sequentially, where the first ultrasonic sensor 711 is subsequently attached to, partially inserted into, or is totally inserted into any number of pipes of the heat exchanger 200, such as a second heat exchange pipe 262, a third heat exchange pipe 263, and/or a fourth heat exchange pipe 264 of n heat exchange pipes 260 of the heat exchanger 200, where sensing thus sequentially senses multiple pipes of the heat exchanger 200, where n is an integer greater than 0, 1, 2, 5, or 10. The ends of the pipes are optionally inlet and/or outlet ends of the pipes.

Example II

In a second case, the first ultrasonic sensor 711 attached to the first heat exchange pipe 261 is used in parallel with n additional ultrasonic sensors 200, of a set of ultrasonic sensors 710, simultaneously sensing additional pipes, such as a second ultrasonic sensor 712 attached to a second heat exchange pipe 262, a third ultrasonic sensor 713 attached to a third heat exchange pipe 263, and/or a fourth ultrasonic sensor 714 attached to a fourth heat exchange pipe 264, where n is an integer greater than 0, 1, 2, 5, or 10.

Example III

In a third case, n ultrasonic sensors are simultaneous positioned in contact with the heat exchanger housing 210 and are operated in series and/or in parallel, where n is an integer greater than 0, 1, 2, 5, or 10. As illustrated, a fifth ultrasonic sensor 715 is attached to a first position of the heat exchanger housing 210 and a sixth ultrasonic sensor 716 to a second position of the heat exchanger housing 210. The first position and second position are optionally separated by greater than 0, 1, 2, 5, 10, 20, 50, 100, or 1000 mm. Herein, in contact refers to direct physical contact, contact through a coupling medium, such as a coupling fluid, a position within less than 10, 5, 2, or 1 mm with any element of the heat exchanger, and/or operational contact—meaning an ability to project into the object and/or detect from the object an ultrasonic signal/vibration/density change.

Example IV

In a fourth case, more than one ultrasonic sensor is attached to separate sections of a common element, such as the first exchange pipe 261, of the heat exchanger housing 210 and are operated in parallel/at the same time.

Example V

In any of the examples provided herein, the ultrasonic signals or force waves from a given ultrasonic sensor 400 optionally cross along, through, and/or across any two or more elements of the heat exchanger to another ultrasonic sensor and/or back to the source ultrasonic sensor. For instance, an ultrasonic wave from the fifth ultrasonic sensor 715 is optionally transmitted at least axially, at least laterally, and/or axially and laterally through multiple elements of the heat exchanger 200 to another ultrasonic sensor, such as a seventh ultrasonic sensor 717 and/or an eighth ultrasonic sensor 718, such as positioned on an opposite or distal side of the heat exchanger 200 from the source ultrasonic sensor on the proximal side of the heat exchanger 200. In this case, the force wave passes around and/or through any one or more of the first heat exchange pipe 261, the second heat exchange pipe 262, the third heat exchange pipe 263, and the fourth heat exchange pipe 264 in addition to the source fluid in the source volume 250 in the carrier pipe between the set of heat exchange pipes 260, thus sensing any element of any of the pipes in the heat exchanger 200.

In any of the examples provided herein, any of the ultrasonic sensors 400 or the set of ultrasonic sensors 710 are optionally used as sources and/or detectors in any combination and/or in any permutation. For instance, the fifth and sixth ultrasonic sensors 715, 716 positioned on the body of the heat exchanger housing 210, such as a proximate side, of the heat exchanger housing are optionally:

- used in parallel with the first and second ultrasonic sensors 711, 712 positioned on inlet ends of members of the heat exchange pipes 260;
- used in parallel with the third and fourth ultrasonic sensors 713, 714 positioned on outlet ends of members of the heat exchange pipes 260; and/or
- used in parallel with the seventh and eighth ultrasonic sensors 717, 718 positioned on a distal side of the heat exchanger housing 210 and/or the heat exchanger 200.

The inventor notes that any one or more sensor is used in place of the fifth or sixth ultrasonic sensors 715, 716 in this example.

Figure 8:
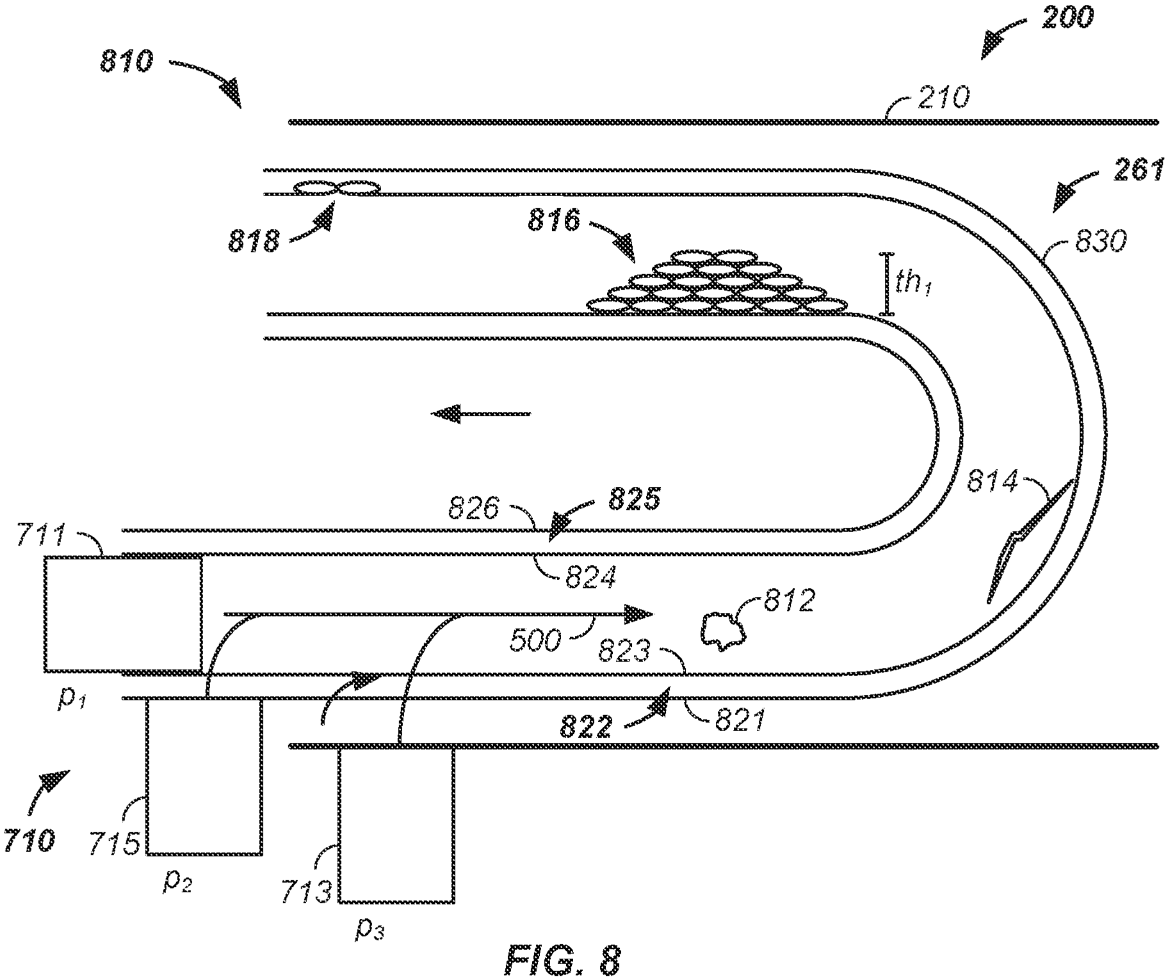
FIG. 8 illustrates pipe state features.

Referring now to FIG. 8, additional examples of uses of ultrasonic sensors are illustrated. As illustrated, states of the heat exchanger 200 are sensed. For example, a first heat exchange pipe 261 of the set of heat exchange pipes 260 is illustrated with a proximal wall 822 having a proximal outer wall surface 821 and a proximal inner wall surface 823; a distal wall 825 having a distal wall inner surface 824 and a distal wall outer surface 825; a bend 830; an imperfection 812, a crack 814, a build-up 816, and corrosion 818. Generally, members of the set of ultrasonic sensors 710 are positioned at any point on/in the heat exchanger 200. As illustrated, the first ultrasonic sensor 711 is positioned at a first position, $p_1$, at least partially within the first heat exchange pipe 261 or any pipe or tube, the second ultrasonic sensor 712 is positioned at a second position, $p_2$, in contact with the proximal outer wall surface 821 of any pipe, such as the first heat exchange pipe 261, and a third ultrasonic sensor 713 is positioned in a third position, $p_3$, in contact with an outer housing surface 210 of the heat exchanger housing 210. Generally, any 1, 2, 3, . . . , n sensors are positioned on a single pipe, two or more pipes, and/or on the heat exchanger housing 210 and are operated in series and/or in parallel to detect source and detector probe signals 500, such as resultant from the force wave 405. Detected signals have differing times of responses, which generally relates to distance and/or response shapes/profiles, which is indicative of a type of the imperfection 812, such as a crack 814, a build-up 816, and/or corrosion 818, as further described infra.

Figure 9:
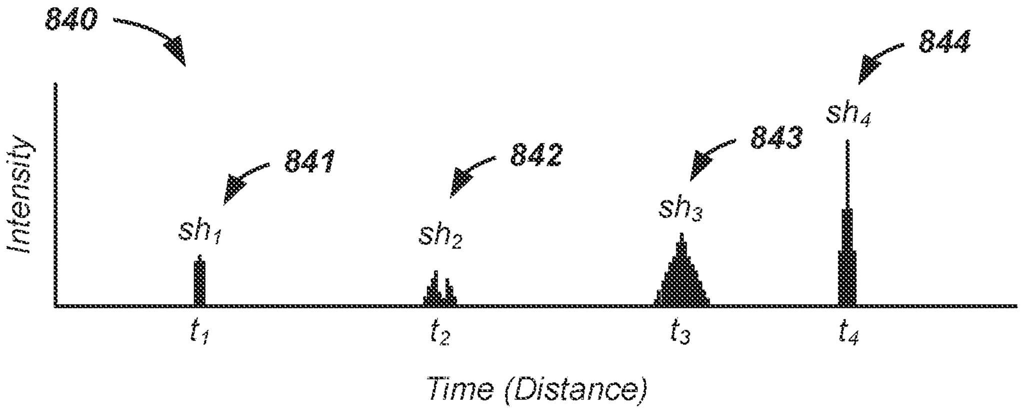
FIG. 9 illustrates signal types.

Referring now to FIG. 9, response signal shapes 840 are further described. For clarity of presentation and without loss of generality, four response signal shapes are described. However, the training algorithms, such as an AI model, learn many shape types. Thus, the four described shapes are illustrative of the many shape types. As illustrated, a first shape 841, $sh_1$, has a peak and a width, which is illustrative of the force wave 405 interacting with the imperfection 812 in FIG. 8, such as at a first distance from the set of ultrasonic sensors 710. Similarly, a second shape 842, $sh_2$, has a shorter peak and a wider width, which is illustrative of the force wave 405 interacting with the imperfection 812 in FIG. 8, such as at a second, longer, distance from the set of ultrasonic sensors 710. Generally, for an identical imperfection, the intensity of the response decreases and the width of the response widens with increasing total traveled of the force wave 405 before reaching a detector. Here, the second shape 842 has a dip in the response, such as in an interior region of a Gaussian response, which is indicative of the imperfection 812 being a crack 814. Similarly, a third shape 843, $sh_3$, has a large width, which is illustrative of the force wave 405 interacting with a thick imperfection 812, such as the thick build-up 816 in FIG. 8. Similarly, a fourth shape 844, $sh_4$, is illustrative of the force wave 405 interacting with the corrosion 818 in FIG. 8.

Figure 10:
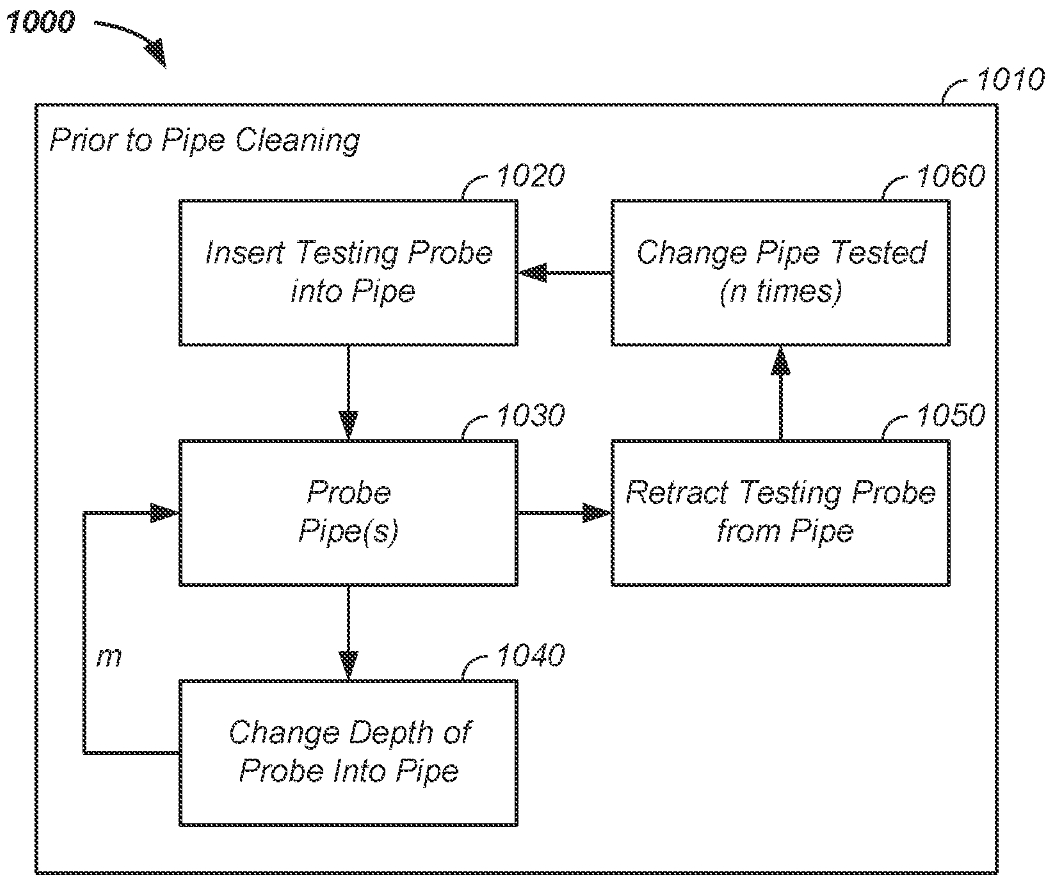
FIG. 10 illustrates a method of pipe probing/state determination.

Referring now to FIG. 10, a first pipe training/testing method 1000 is illustrated. Generally, the first training/testing method 1000 is optionally used in training with new pipes in a new heat exchanger. However, the first training/testing method 1000 is illustrated operationally for real-time testing. For example, at a time period prior to pipe cleaning 1010, in a first step a testing probe is inserted 1020 at least partially into any pipe of the set of pipes 260, where the testing probe has at least one ultrasonic sensor. In a second step the pipe is probed 1030, such as with any of the ultrasonic testing techniques described herein. Optionally, in a third step the depth of the probe in the pipe is altered 1040, such as at a deeper depth. The probing step is then repeated. Optionally, the depth altering 1040 and probing 1030 steps are repeated m times, where m is a positive integer greater than 1, 2, 3, 5, or 10. In a fifth step, the probe is retracted 1050 from the pipe and in a sixth step, the probe is inserted into a new pipe 1060, where the probing 1030 and depth change 1040 steps are optionally and preferably repeated for n pipes, where n is a positive integer greater than 1, 2, 3, 4, 5, 10, 20, or 50.

Figure 11:
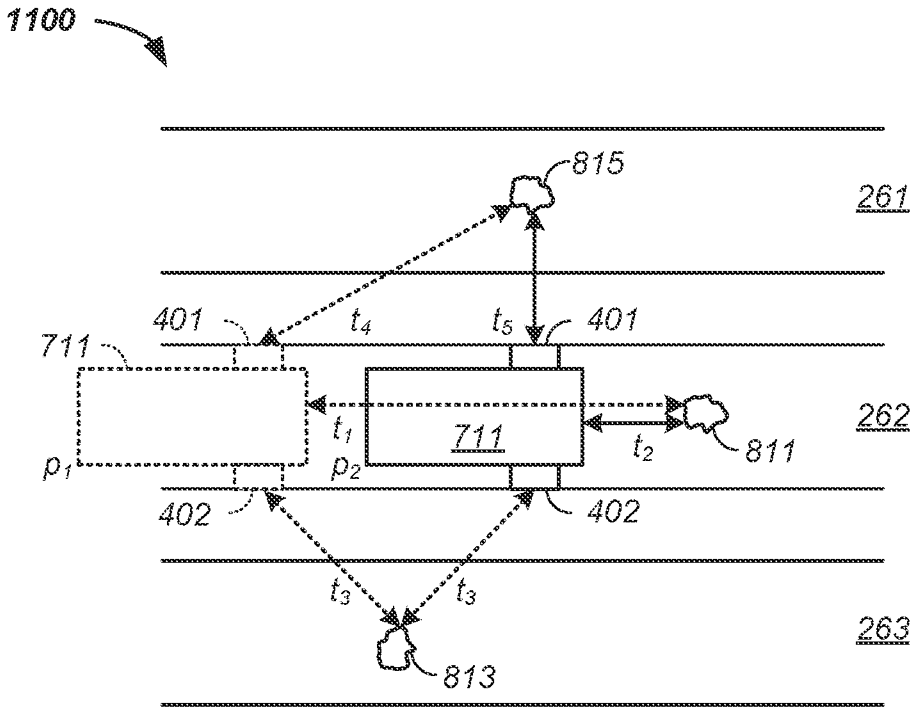
FIG. 11 illustrates pipe probing.

Referring now to FIG. 11, a second pipe training/testing method 1100 is illustrated. In this method, a probe, such as a probe carrying the first ultrasonic sensor 711 senses imperfections in one and preferably multiple pipes as a function of time and/or position. Generally, the first ultrasonic sensor 711 contains at least one ultrasonic transducer, such as a first ultrasonic transducer 401 and preferably contains a number of ultrasonic transducers, such as a second ultrasonic transducer 402. For clarity of presentation and without loss of generality several examples of differing time signals are provided.

Example I

Still referring to FIG. 11, as illustrated, when the first ultrasonic sensor 711 is at a first position, a signal related to a first imperfection 811 is received at a first time, $t_1$. As the probe moves towards the first imperfection 811, the sensed signal is observed with smaller elapsed times. For instance, when the first ultrasonic sensor is at a second position, $p_2$, closer to the first imperfection 811, the signal related to the first imperfection 811 is observed with a second, shorter, elapsed time, $t_2$. The time differences yield an additional measure of the location of the first imperfection 811, such as time to the first imperfection signal approaches zero as the first ultrasonic sensor 711 approaches the first imperfection 811.

Example II

Still referring to FIG. 11, as illustrated, the first ultrasonic sensor 711 is optionally used to examine a pipe of the set of pipes 260 that has not yet been cleaned or had a testing probe inserted therein. For instance, the first ultrasonic sensor is currently positioned in a second heat exchange pipe 262 and a signal at a third time, $t_3$, is observing a third imperfection 713 in a third heat exchange pipe 262, where the first ultrasonic sensor 711 has not yet been in the third heat exchange pipe 262, at least in this cleaning/testing cycle, such as within the last month or year. Generally, the time to the third imperfection 813 decreases until the relevant transducer is next to the imperfection and increases thereafter as the transducer passed the imperfection. As illustrated, a special case is observed where the third elapsed time, $t_3$, observes the same imperfection, such as in equidistant positions of the second ultrasonic transducer 402 positioned before and after the third imperfection 813.

Example III

Still referring to FIG. 11, as illustrated, the first ultrasonic sensor 711 is optionally used to examine a pipe of the set of pipes 260 that has already been cleaned or had a testing probe inserted therein. For instance, as illustrated, the first heat exchange pipe 261 was already cleaned, such as within the last day. As illustrated, a signal at a fourth time, $t_4$, and a signal at a fifth time, $t_5$, relative to the first ultrasonic sensor 711 at the first position and the second position in the second heat exchange pipe 262 indicates a fifth imperfection 815 was missed or not yet corrected in the first heat exchange pipe 261. Hence, already cleaned pipes are optionally and preferably tested while cleaning a subsequent pipe. Dual sensing and cleaning is further described, infra.

AI Model

Herein, for clarity of presentation and without loss of generality, an AI model is representative of any model. The model is optionally and preferably a heat exchanger state model, which models a heat exchanger with inputs from sensors, such as in terms of current state of any one or more elements of the heat exchanger, such as location of any imperfection type; any recommendation for action, such as cleaning or plugging one or more pipes; an ability to accept additional inputs to further train the model; and/or an ability to communicate any suggestion/recommendation/output to another program/system and/or an operator, such as a human via any output means.

Figure 12:
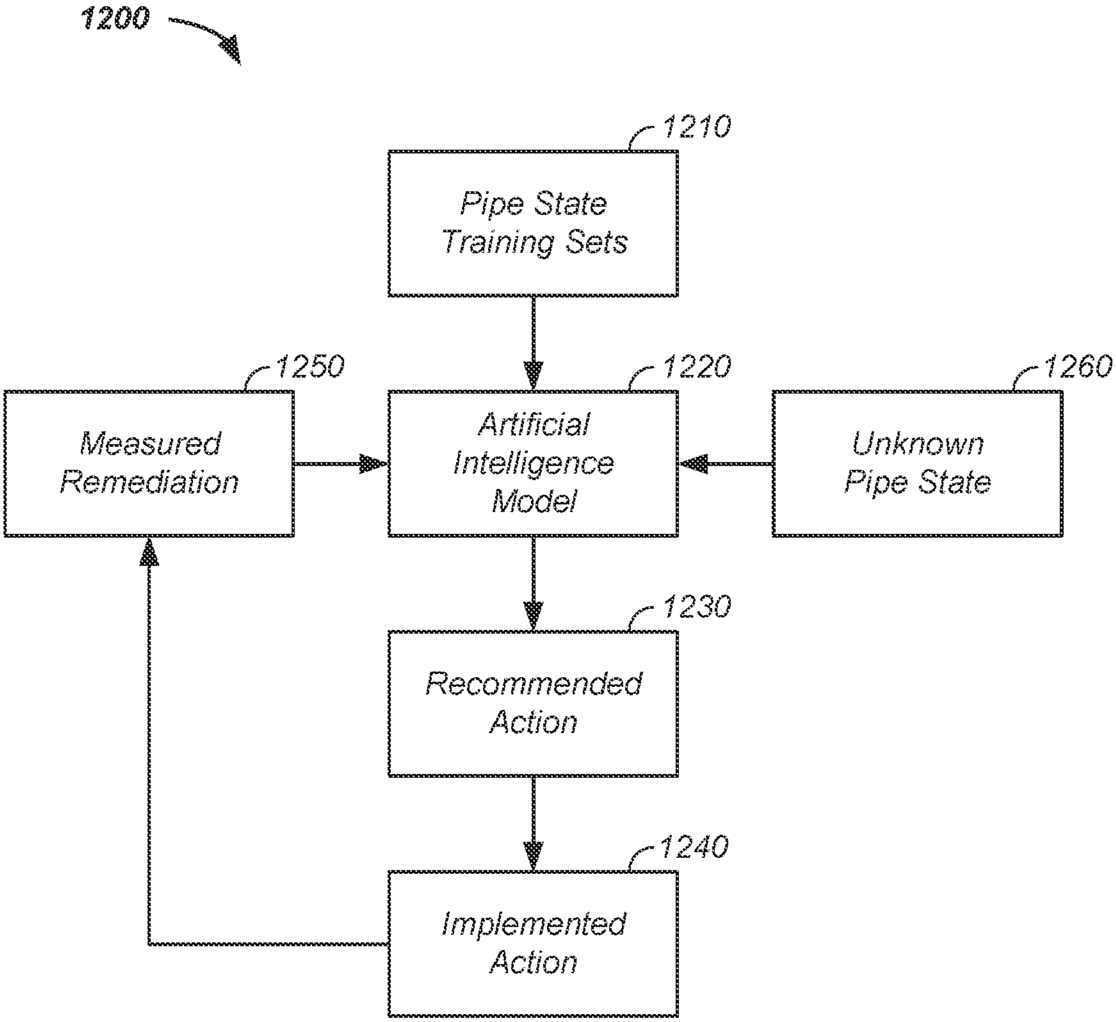
FIG. 12 illustrates a method of using artificial intelligence to aid pipe cleaning.

Referring now to FIG. 12, artificial intelligence training 1200 of heat exchanger state is illustrated. Generally, measuring pipe states with the ultrasonic sensors with pipes in known states 1210 is optionally used to train an artificial intelligence (AI) model 1220/an AI system. The AI model 1220 is optionally trained using transducer signals from unknown pipe states 1260. A third type of training involves the process of the AI model recommending an action 1230, such as cleaning a pipe position; implementing the action 1240; and measuring the remediation 1250, such as after implementing the action, and using the "feedback" signal to further train the AI model 1220. Generally, the use of a-priori information, such as with the known states; the use of unknown pipe state 1260; and/or the use of the feedback remediation signal 1250 are used in any combination to train the AI model 1220.

Figure 13:
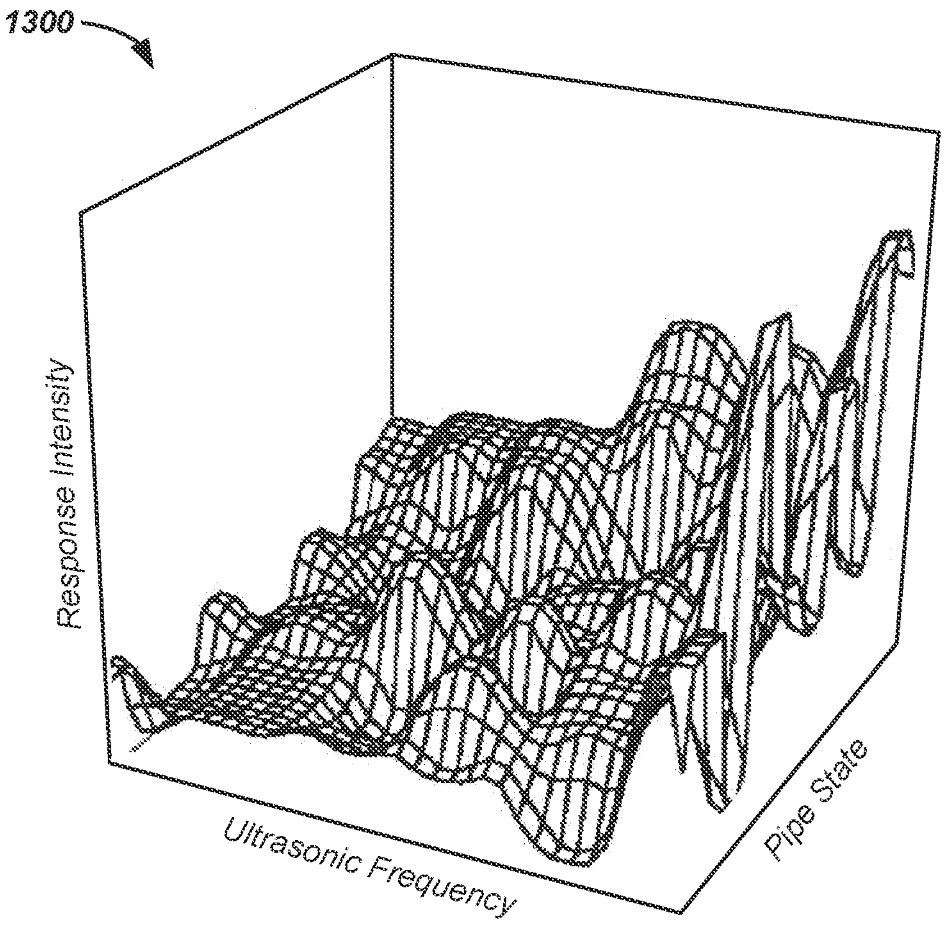
FIG. 13 illustrates mapped signals versus probe frequencies and pipe state.

Referring now to FIG. 13, a representative response profile 1300 is provided. Generally, the AI model 1220 is trained with signals/response intensities as a function of time/position for a range of pipe states with a range of ultrasonic frequencies used in the set of ultrasonic sensors 710. State of the heat exchanger 200 and/or any of the set of heat exchange pipes 260 therein is "mapped" with the AI model 1220 and the AI model 1220 optionally outputs one or more recommendations for how/when/where/why to clean/repair any element of the heat exchanger 200.

Figure 14:
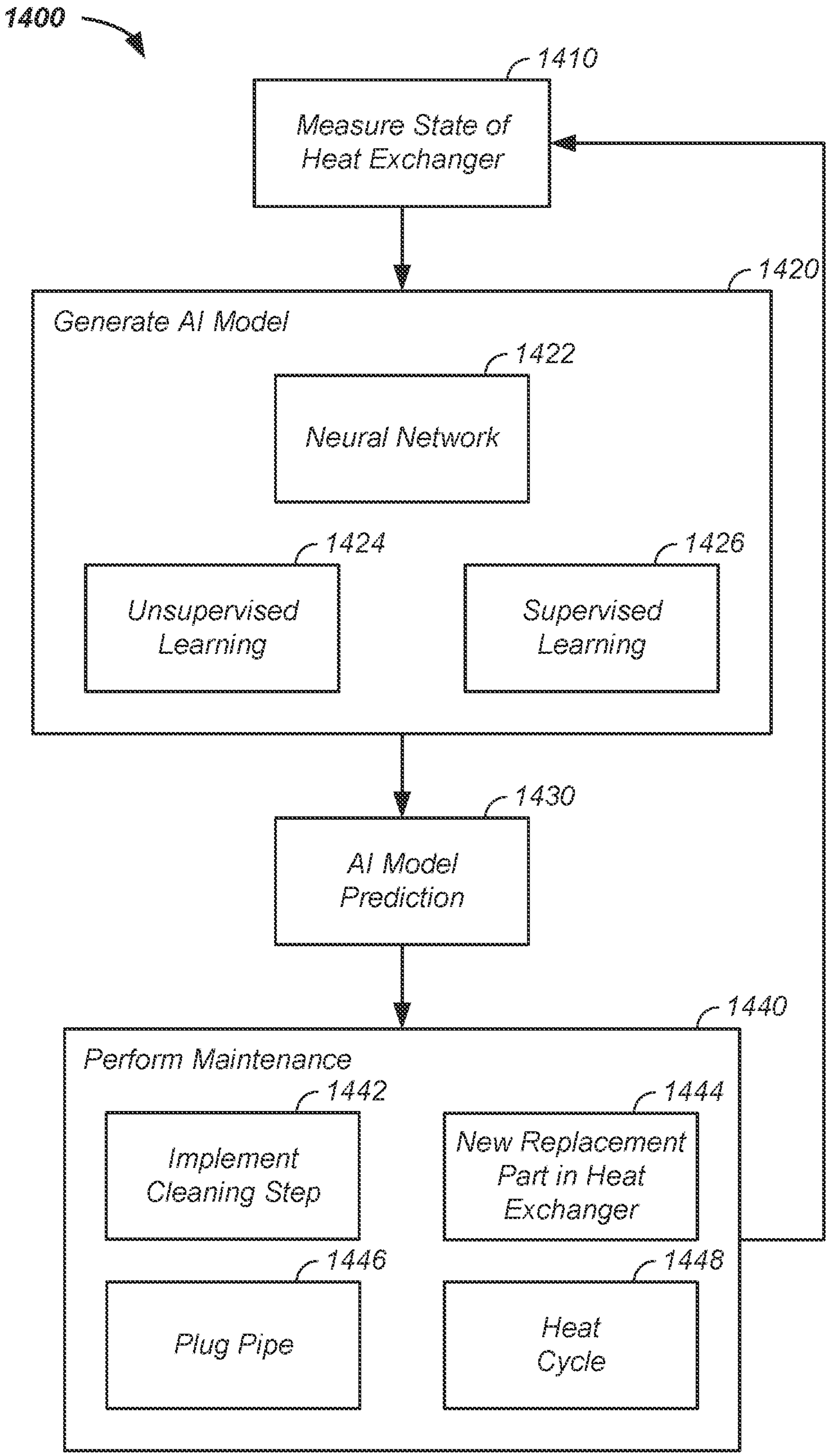
FIG. 14 illustrates a method of artificial intelligence guided cleaning.

Referring now to FIG. 14, training/use 1400 of the AI model 1220 is described. In this example, provided for clarity of presentation and without loss of generality, state of the heat exchanger is measured 1410, such as with any of the sensors described herein and the resulting signals/intensities as functions of time/position and/or any known states of the heat exchanger 200 or elements thereof are used to train 1420 the AI model 1220, such as via use of a neural network 1422, unsupervised learning 1424, and/or supervised learning 1426. The AI model 1220 subsequently yields an output, such as an AI model prediction 1430. Maintenance 1440 is optionally and preferably performed, such as based on the AI model prediction 1420. Representative maintenance steps include: implementing a cleaning step 1442, installing a new/replacement part 1444 in the heat exchanger 200, plugging a pipe 1446 of the set of heat exchange pipes 260, such as when a leak, crack, large build-up, and/or sufficient corrosion is detected, and/or performing a heat cycle 1448 on the heat exchanger, such as to clear partially clogged pipes. Optionally, testing/measuring state of the heat exchanger 1410, such as described supra, on the now maintained parts is used to further train/generate the AI model 1420.

Figure 15:
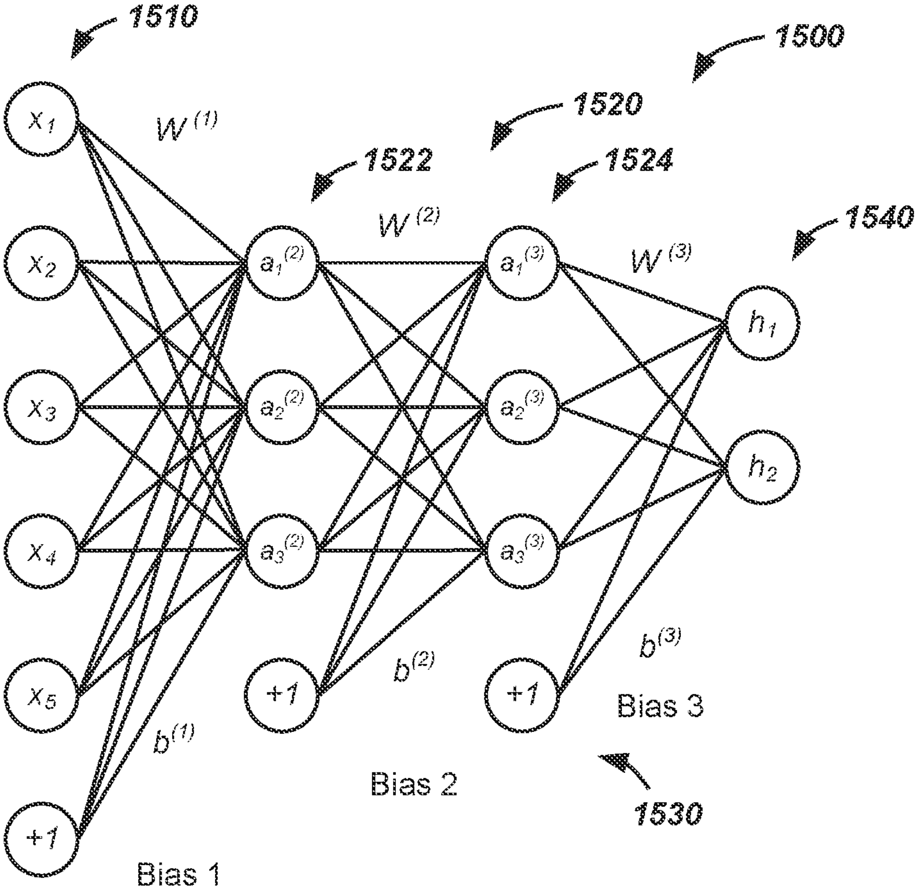
FIG. 15 illustrates a neural network.

Referring now to FIG. 15, an exemplary AI model, such as a neural network 1500 is illustrated. Generally, the neural network contains an input layer 1510, a set of one or more hidden layers 1520, a set of biases 1530, and an output layer 1540. Here, five inputs are illustrated ($x_{(1-5)}$). The specification herein describes how to generate the inputs, such as with response signals/intensities of the ultrasonic sensors testing various aspects of the heat exchanger 200. Two hidden layers, a first hidden layer 1522 and a second hidden layer 1524, are illustrated of n optional hidden layers, where n is a positive integer greater than 0, 1, 2, 5, or 10. The set of biases 1530 optionally includes a bias for the input layer 1510 and/or any hidden layer. The output layer 1540 yields the AI model predictions 1430, described supra. Additional examples of generating inputs to the AI model 1220 and using outputs of the AI model 1220 are further described infra.

Sensing

Figure 16:
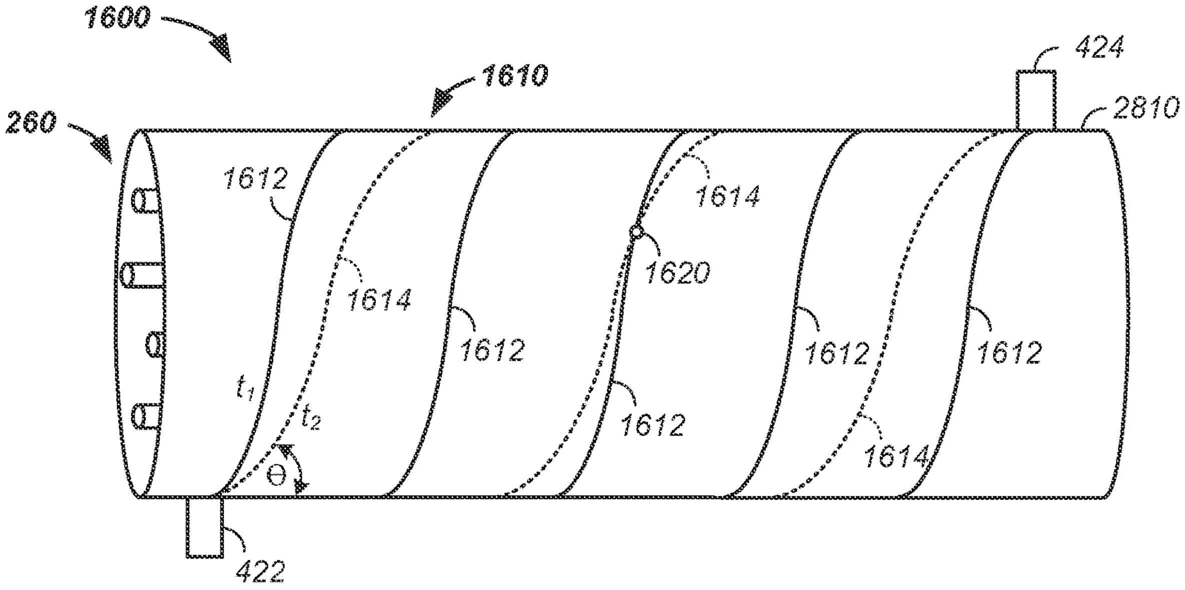
FIG. 16 illustrates helical probing along a length of a pipe.

The ultrasonic sensor 400 is optionally used to measure across any pipe, along any pipe, and/or around any pipe/member of the set of heat exchange pipes 260 of the heat exchanger. Referring now to FIG. 16 a guided wave system 1600 is illustrated where differing areas of the heat exchanger housing 210 and/or the heat exchanger 200 and/or a tube are dynamically probed with the ultrasonic sensor 400. Referring still to FIG. 16, at a first time, $t_1$, a first guided wave is generated by a pulse generation section or transmitting section 422, of the ultrasonic sensor 400/transducer, at a first angle, e, between 0 and 90 degrees, relative to a length of the heat exchanger 200, which sends the force wave 405 along a first centralized helical path 1612 down the pipe to at least one detection section 424 of the ultrasonic sensor 400. Thus, the first helical path 1612 that has a 95% probability width of less than 1, 2, 5, 10, 20, 50, or 100 cm, with a first number of rotations around the heat exchanger 200 per unit length, probes a first set of areas/volumes of the heat exchanger 200. At a second time, $t_2$, a second guided wave, with angles and widths in a range of the first guided wave, is generated by the pulse generation section/transmission section 422, of the ultrasonic sensor 400, at a second angle at least 1, 2, or 5% different than the first angle, which sends the force wave 405 along a second centralized helical path 1614 down the pipe to at least one detection section 715 of the ultrasonic sensor 400 with a second number of rotations around the heat exchanger 200/tube per unit length. Optionally and preferably, the second number of rotations of the second helical path is at least plus/minus 10, 20, 50, or 100% that of the first number of rotations of the first helical path per unit length, such as a 1, 2, 3, or more meters. As illustrated, the first helical path 1612 and the second helical path 1614 probe primarily different areas/volumes of the pipe; however, there are some overlaps, such as at a first overlap point 1620. Thus, if an imperfection is measured, such as with a common absorbance signal/imperfection 812, with the first helical path 1612 and the second helical path 1614, a precise imperfection location is identified. In practice, many launch angles, such as greater than 2, 4, 6, 8, or 10, of the force wave 405 are used to cover greater than 50, 60, 70, 80, 90, 95, or 98% of the heat exchanger 200 area/volume and/or to yield overlap areas of the helical paths covering greater than 50, 60, 70, 80, 90, 95, or 98% of the pipe area/volume. The inventors note that the helical probing of the heat exchanger 2810 allows for analysis of an opposite side of the pipe relative a location of the ultrasonic sensor 400 even when the heat exchanger 200, pipe thereof and/or tube thereof is only partially filled or is empty, which is not possible with a traditional use of an ultrasonic transducer as the force wave 405 will not effectively penetrate through air in the pipe. Optionally and preferably, the ultrasonic sensor 400 generates pulses at a rate in a range of 40 KHz to 40 MHz or 400 KHz to 25 MHz.

Figure 17:
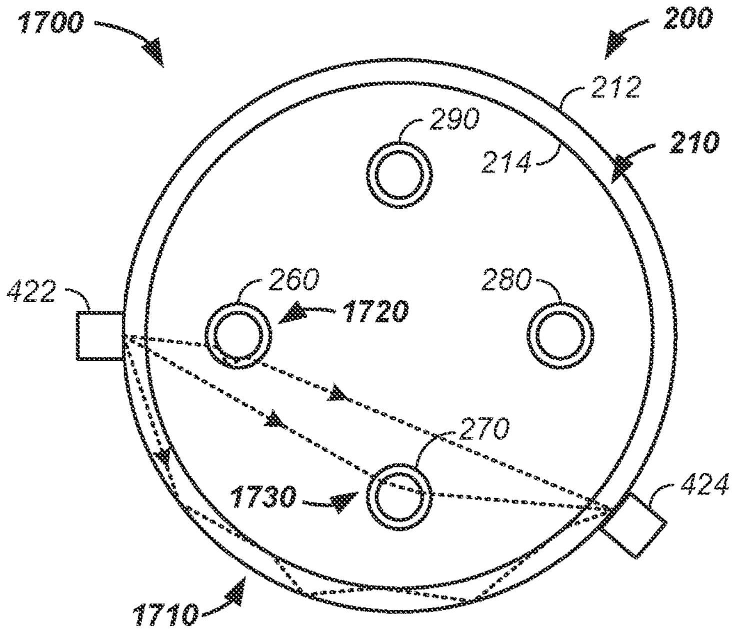
FIG. 17 illustrates intra-pipe probing.

Referring now to FIG. 17, intra-pipe sensing 1700 is illustrated. First, internal reflectance 1710 of the force wave 405 within the heat exchanger housing 210 between a housing outer wall 212 and a housing inner wall 214 is illustrated, such as between the transmitting section 422 and the detection section 424 of an ultrasonic sensor, which yields information of the heat exchanger housing 210 or similarly any tube. Second, transmission into the main pipe chamber 224 is illustrated along with sensing walls of a first pipe 260 therein is illustrated in an intra-pipe path 1720. Third, an intra-internal pipe path 1730 is illustrated where the force wave 405 between the transmitting section 422 and the detection section 424 passed through an inner volume/fluid path of an internal heat exchange pipe is illustrated, such as through a second pipe 270. Similar paths optionally pass around and/or through a third pipe and/or a fourth pipe 280 in the heat exchanger 200.

Model Development

Figure 18:
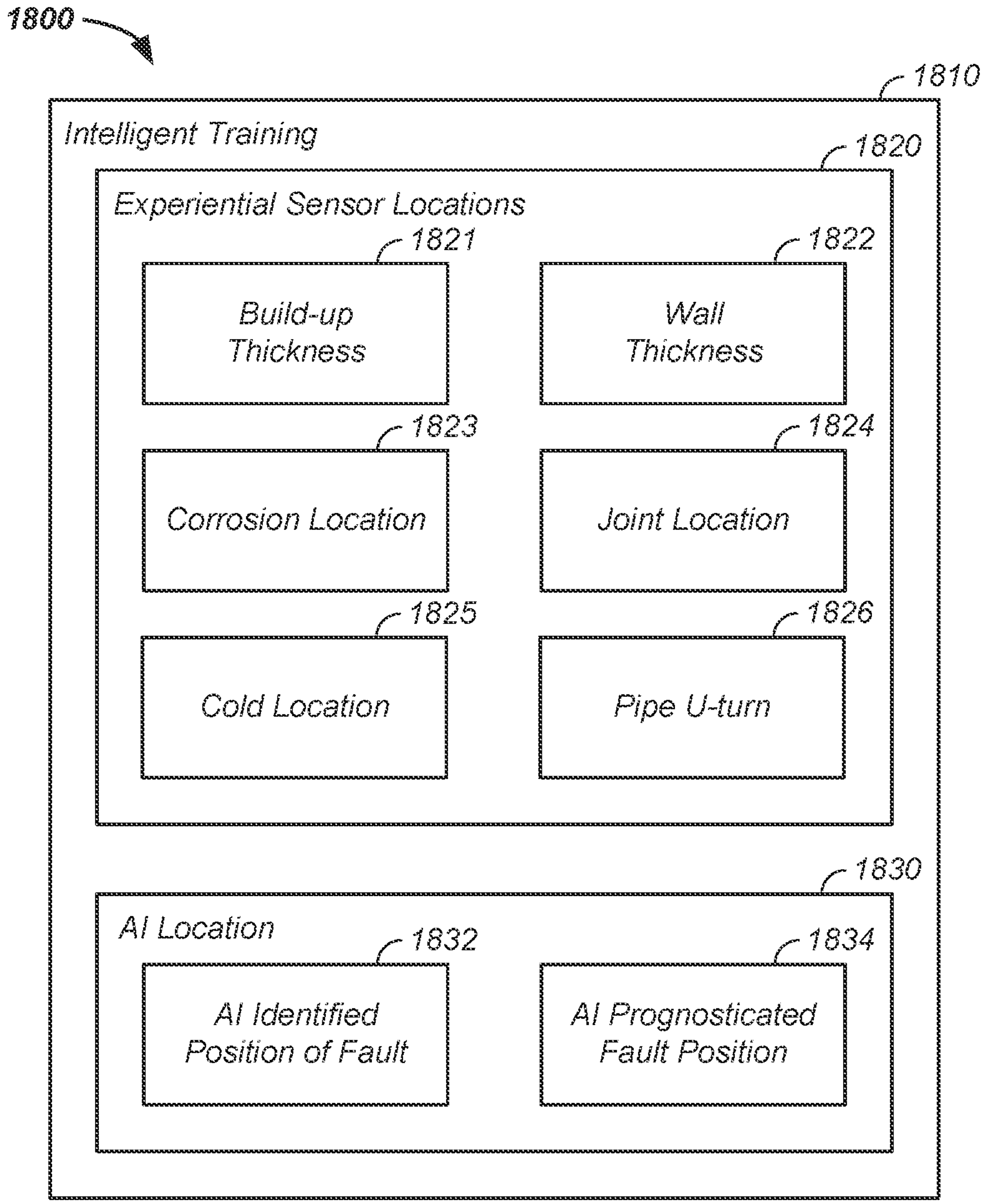
FIG. 18 illustrates a method of intelligent artificial intelligence training.
Figure 19A:
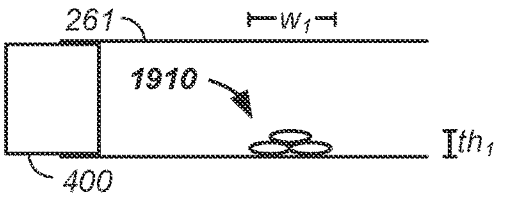
FIG. 19A illustrates a first build-up.
Figure 19C:
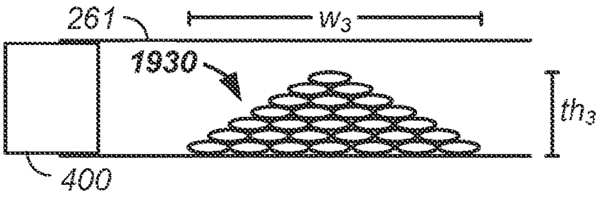
FIG. 19C illustrates a third build-up.
Figure 19B:
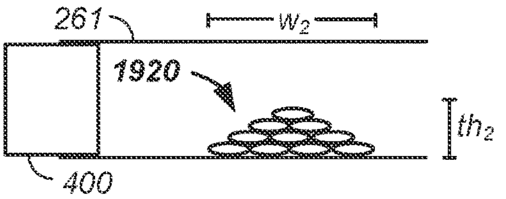
FIG. 19B illustrates a second build-up.
Figure 19D:
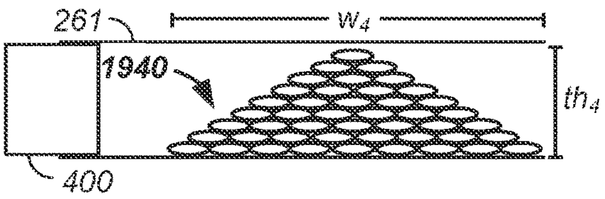
FIG. 19D illustrates a fourth build-up in a pipe.

Referring now to FIG. 18, optional model training 1800 is further described. As illustrated, intelligent model training 1810 is illustrated. Generally, experiential sensor locations 1820 relate to placing sensors, such as the ultrasonic sensor 400, at locations on previously learned problem area types or controlled samples with a known build-up thickness 1821 or related known build-up material types, a known wall thickness 1822, a known corrosion location 1823/thickness/material, a known joint location 1824, a known historically colder than adjacent areas location 1825, and/or a known pipe turn/U-turn location 1826. Similarly, the intelligent model training 1810 uses input from AI identified locations 1830, such as an AI identified fault position 1832 and/or and AI prognosticated fault position 1834. For clarity of presentation and without loss of generality, several examples follow.

Example I

Referring now to FIGS. 19(A-D), AI model 1220 training using known and/or controlled build-up or partial blockages of a pipe are illustrated. Referring now to FIG. 19A, a first heat exchange pipe 261 and/or stand-alone pipe is illustrated with an ultrasonic sensor 400 configured to sense a first build-up 1910 with a first width, $w_1$, a first thickness, $th_1$, a first density, and/or a first composition. Generally, the ultrasonic sensor 400 is then trained with a known first build-up 1910. Similarly, referring now to FIG. 19B, a second build-up 1920 with a second width, $w_2$, a second thickness, $th_2$, a second density, and/or a second composition is tested with the ultrasonic sensor 400 and the result used to train the AI model 1220 with a second known state, the second known state again optionally and preferably fed to the AI model 1220, such as through the supervised learning 1426. Similarly, referring now to FIGS. 19(C-D), a third/fourth build-up 1930/1940 with a third/fourth width, thickness, density, and/or composition is tested with the ultrasonic sensor 400 and the results used to train the AI model 1220 with a third/fourth known state, the third/fourth known state again optionally and preferably fed to the AI model 1220, such as through the supervised learning 1426.

Figure 20:
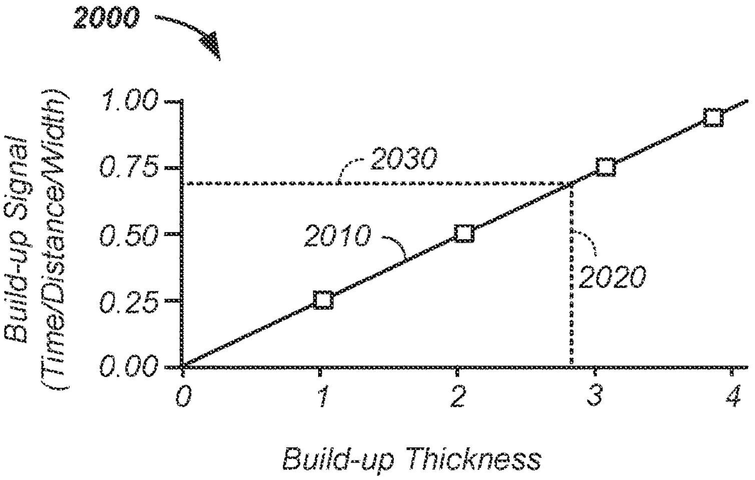
FIG. 20 illustrates build-up threshold detection.

Referring still to FIGS. 19(A-D) and referring now to FIG. 20, data points corresponding to the first through fourth build ups (1910, 1920, 1930, 1940) are fit 2010, such as with a regression model. A threshold build-up thickness 2020 is set and a corresponding build-up signal 2030, such a time, distance, intensity, and/or width, is established where reaching or exceeding the build-up signal triggers an AI output, such as an output layer 1540, indicating that the pipe needs to be cleaned. Similar inputs, outputs, and/or training for other known issues, such as pipe thickness (corrosion) and/or cracks further illustrates the intelligent training 1810 process, as described infra.

Example II

Figure 21A:
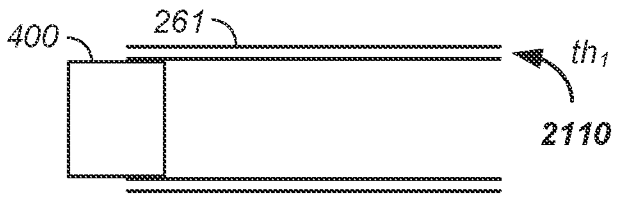
FIG. 21A illustrates analysis of a first pipe thickness.
Figure 21B:
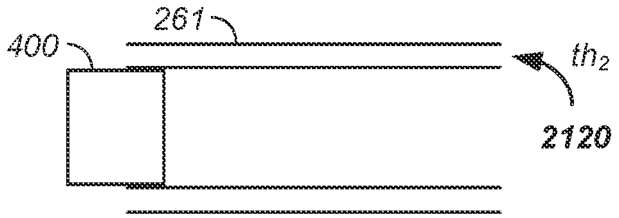
FIG. 21B illustrates analysis of a second pipe thickness.
Figure 21C:
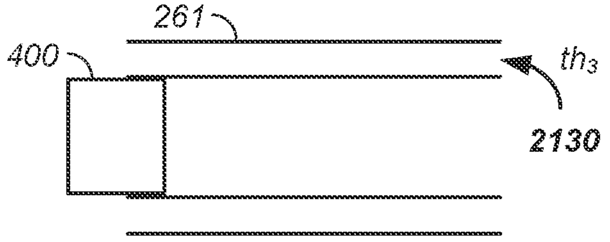
FIG. 21C illustrates analysis of a third pipe thickness.

Referring now to FIGS. 21(A-C), AI model 1220 training using known and/or controlled wall thicknesses of a pipe are illustrated. Referring now to FIG. 21A, a first heat exchange pipe 261 and/or stand-alone pipe is illustrated with an ultrasonic sensor 400 configured to sense an, optionally and preferably known, first wall thickness 2110 with a first thickness, $th_1$, a first density, and/or a first composition. Generally, the ultrasonic sensor 400 is then trained with the known first wall thickness 2110. Similarly, referring now to FIG. 21B, a second pipe with a second wall thickness 2120, $th_2$, a second density, and/or a second composition is tested with the ultrasonic sensor 400, where the result is used to train the AI model 1220 with a second known state. For instance, the resultant signals are optionally and preferably fed to the AI model 1220, such as through the supervised learning 1426. Similarly, referring now to FIGS. 21C, a third wall thickness 2130 with a third, thickness, density, and/or composition is tested with the ultrasonic sensor 400 and the results used to train the AI model 1220 with a third known state, the third known state again optionally and preferably fed to the AI model 1220, such as through the supervised learning 1426. As with the build-up, any number of wall thicknesses, wall compositions, and/or wall densities are used in training the AI model 1220.

Figure 22:
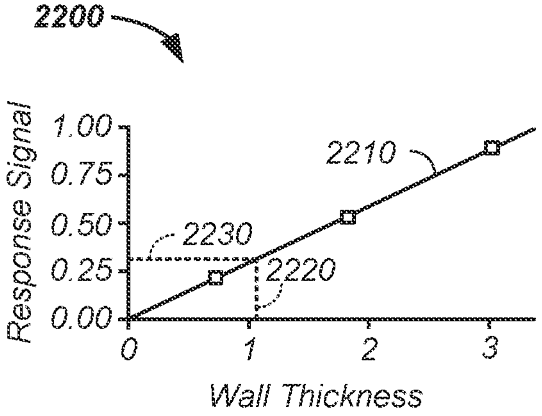
FIG. 22 illustrates pipe thickness threshold detection.

Referring still to FIGS. 21(A-C) and referring now to FIG. 22, data points corresponding to the first through third wall thickness (2110, 2120, 2130) are used to develop a response 2210, such as with a regression model. A threshold wall thickness 2220 is set, through engineering, experience, and/or prediction of the AI model, and a corresponding wall thickness signal 2230, such a time, distance, intensity, and/or width, is established where reaching or falling below the wall thickness signal triggers an AI output, such as an output layer 1540, indicating that the pipe needs to be plugged or replaced.

Example III

Figure 23A:
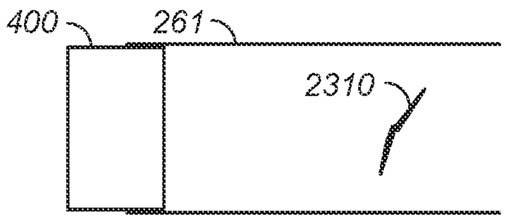
FIG. 23A illustrates detection of a thin pipe crack.
Figure 23B:
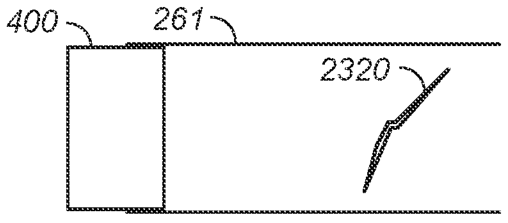
FIG. 23B illustrates detection of a medium pipe crack.
Figure 23C:
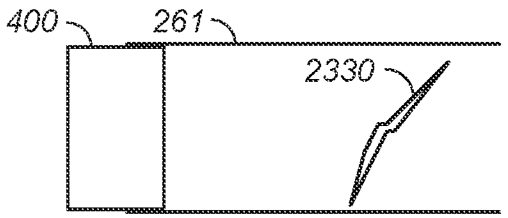
FIG. 23C illustrates detection of a large pipe crack.

Referring now to FIGS. 23(A-C), AI model 1220 training using known and/or controlled cracks, with known parameters, such as thickness of the crack and/or length of the crack, are illustrated. Referring now to FIG. 23A, a first heat exchange pipe 261 and/or stand-alone pipe is illustrated with an ultrasonic sensor 400 configured to sense an, optionally and preferably known, first crack state 2310, such as a thin crack. Generally, the ultrasonic sensor 400 is then trained with the known first crack state 2110. Similarly, referring now to FIG. 23B, a second pipe with a second crack state 2320 is tested with the ultrasonic sensor 400, where the result is used to train the AI model 1220 with a second known state. For instance, the resultant signals are optionally and preferably fed to the AI model 1220, such as through the supervised learning 1426. Similarly, referring now to FIG. 23C, a third crack state 2330 is tested with the ultrasonic sensor 400 and the results used to train the AI model 1220 with a third known state, the third known state again optionally and preferably fed to the AI model 1220, such as through the supervised learning 1426. As with the build-up and/or corrosion any number and/or combination of crack states, wall thicknesses, wall compositions, and/or wall densities are used in training the AI model 1220, such as cracks of less than 0.01, 0.1, 0.2, or 0.5 mm thickness and/or cracks of greater than 0.01, 0.02, 0.05, 0.1, 0.25, or 0.5 mm thickness.

Figure 24:
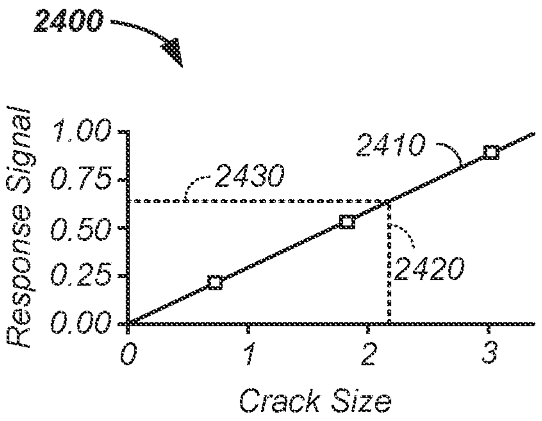
FIG. 24 illustrates pipe crack threshold detection.

Referring still to FIGS. 23(A-C) and referring now to FIG. 24, data points corresponding to the first through third crack states (2310, 2320, 2330) are used to develop a crack model response 2410, such as with a regression model. A threshold crack state 2420, such as length and/or width, is set, through engineering, experience, and/or prediction of the AI model, and a corresponding wall crack state signal 2430 is established where reaching or exceeding the threshold crack state 2420 triggers an AI output, such as an output layer 1540, indicating that the pipe needs to be plugged or replaced. Generally, any known or controlled pipe state is optionally used to train the AI model 1220.

Figure 25:
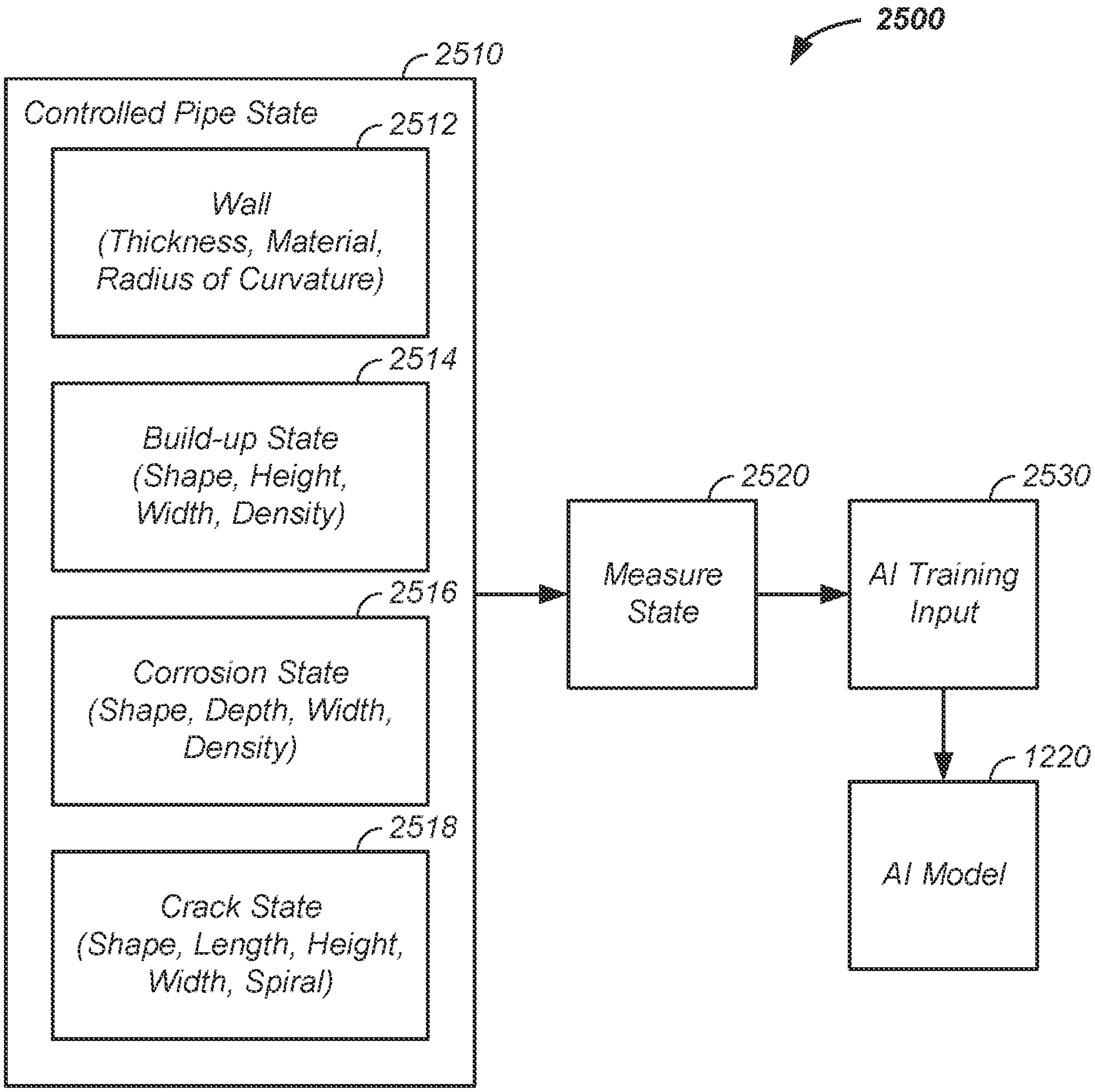
FIG. 25 illustrates model development with controlled pipe states.

Referring now to FIG. 25, combined state AI training 2500 is described. Generally, a controlled pipe state 2510 is measured 2520 and the resulting signals are used as AI training input 2530 in development of the AI model 1220. Generally, the controlled pipe state 2510 uses a pipe with known state parameters, such as: known wall properties 2512, such as thickness, material, and/or radius of curvature; known build-up state 2514, such as shape, thickness, height, material, density, and/or width; known corrosion state 2516, such as shape, depth, width, composition, and/or density; and/or known crack state 2518, such as shape, spiral shape, length, and/or width, where any of the crack states are tested in any geometry and/or positions relative to any number of ultrasonic sensors in individual pipes and/or in any position of a heat exchanger 200.

Figure 26:
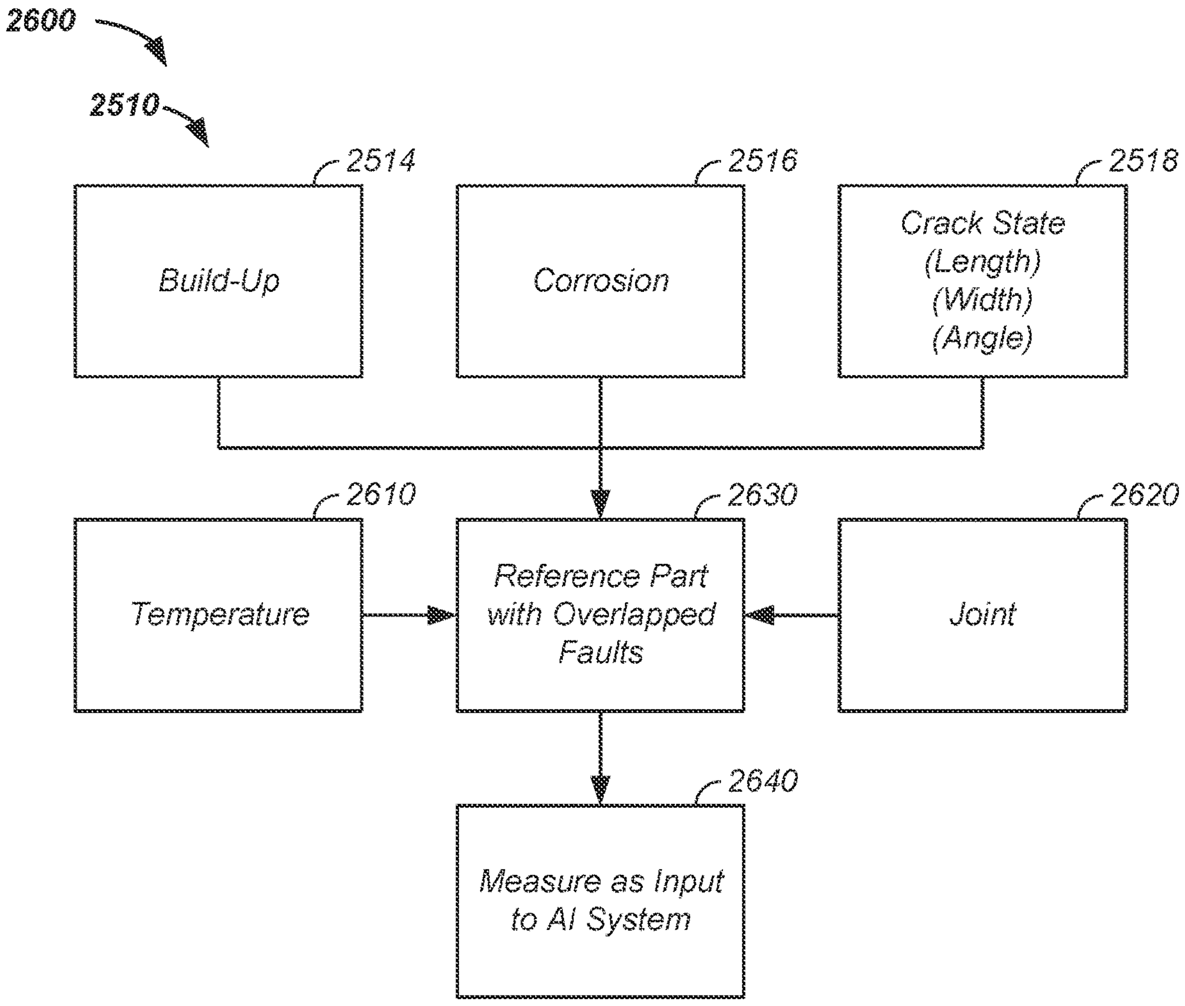
FIG. 26 illustrates AI pipe state model training.

Referring now to FIG. 26, pipe state/environment AI training 2600 is described. Generally, any element of the combined state AI training 2500 is tested in known environmental conditions, such as at known and/or controlled temperatures 2610 and/or with a known distance to a joint 2620, such as less than 1, 2, 5, 10, 20, 50, 100, 500, or 1000 mm. Stated again, a controlled pipe state 2510, such as with known build-up 2514, corrosion 2516, and/or crack state 2518, combines to form a reference part 2630 with overlapped faults, which is optionally tested at any temperature 2610 and/or in any position of a pipe or heat exchanger 400, such as in relation to a joint 2620, where resulting signals are used as AI system inputs 2640.

Combined Cleaning and Testing

Figure 27A:
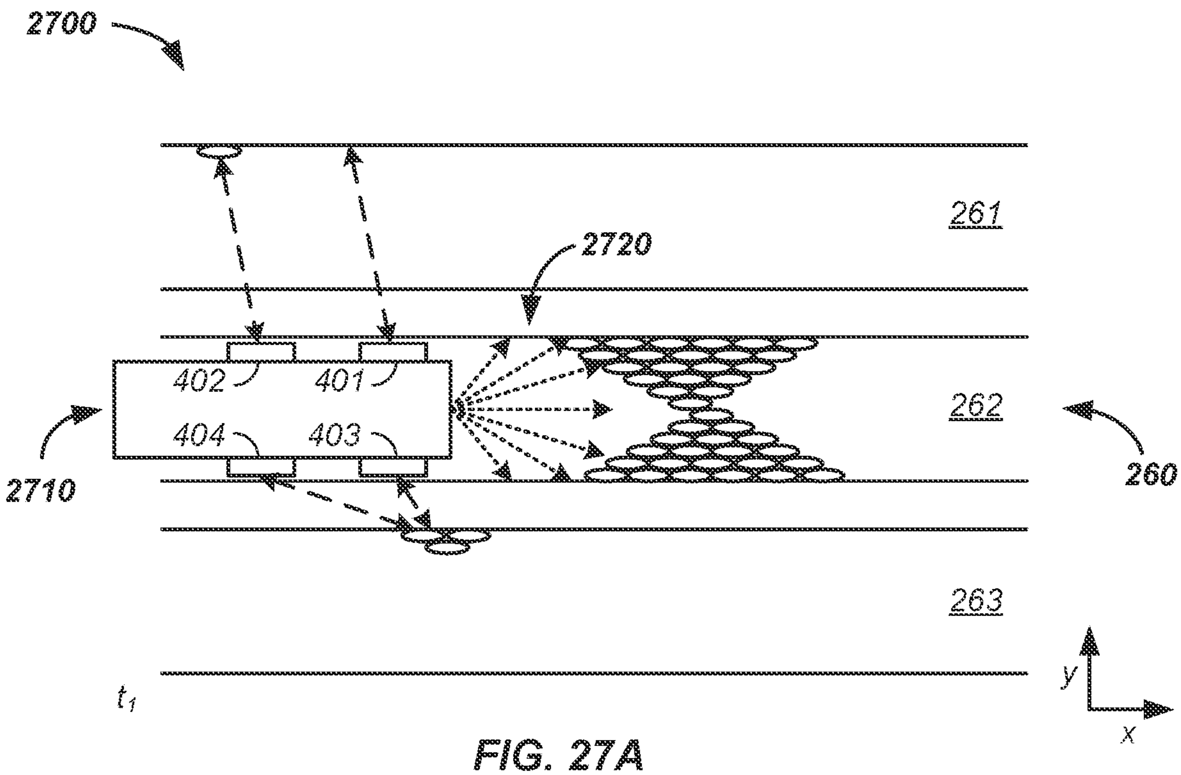
FIG. 27A illustrates a pipe state sensor equipped blasting lance and FIG. 27B illustrates cleaned pipe fault detection with a sensor equipped cleaning lance.

Referring now to FIG. 27A, pipe cleaning 2700 with a blasting lance 2710 is described. Generally, the blasting lance 2710 is sequentially inserted into any member of the set of heat exchange pipes 260. As illustrated, the blasting lance 2710 is currently inserted into the second heat exchange pipe 262. The blasting lance 2720 sprays a cleaning fluid 2720 forward into the pipe, such as from a front end of the blasting lance 2710, to clean/dislodge material in the pipe, such as a build-up of material. Generally, the blasting lance 2710 is pushed or crawls forward in the pipe and dislodges additional material with the cleaning fluid as it moves forward in the pipe. The cleaning fluid is any combination of any liquid, air, and/or detergent. Notably, the cleaning fluid is optionally simply pressurized air. The cleaning fluid 2720 is optionally and preferably pressurized, such as with a spray nozzle between a cleaning fluid supply reservoir and an interior of the pipe and/or is optionally pressurized with a pump (not illustrated for clarity of presentation).

Still referring to FIG. 27A, the blasting lance 2710 is optionally and preferably combined with any number of ultrasonic sensors, such as a first ultrasonic sensor 401, a second ultrasonic sensor 402, a third ultrasonic sensor 403, and/or a fourth ultrasonic sensor 404, where any of the ultrasonic sensors comprise any element of any of the ultrasonic sensors/ultrasonic transducers described herein. As illustrated, a first plurality of sensors are positioned on a first side of the blasting lance 2710 and a second plurality of sensors are positioned on a second side of the blasting lance 2710. Generally, any number of sensors are positioned on any three-dimensional side of the blasting lance 2710 to sense surrounding pipes and/or on the front end of the blasting lance to sense upcoming imperfections, such as build-ups of material in the pipe. Any of the sensors are positioned in direct physical contact with the blasting lance 2710, such as directly affixed to a side of the blasting lance and/or at least partially embedded in a blasting lance housing of the blasting lance 2710. The sensors optionally operated at fixed positions of the blasting lance 2710 in a pipe and/or operate while the blasting lance is moving down the length of a pipe from a first position to a second position separated by more than 0.01, 0.1, 1, 2, 5, 10, 25, 50, 100, 500, 1000, or 10000 mm.

Figure 27B:
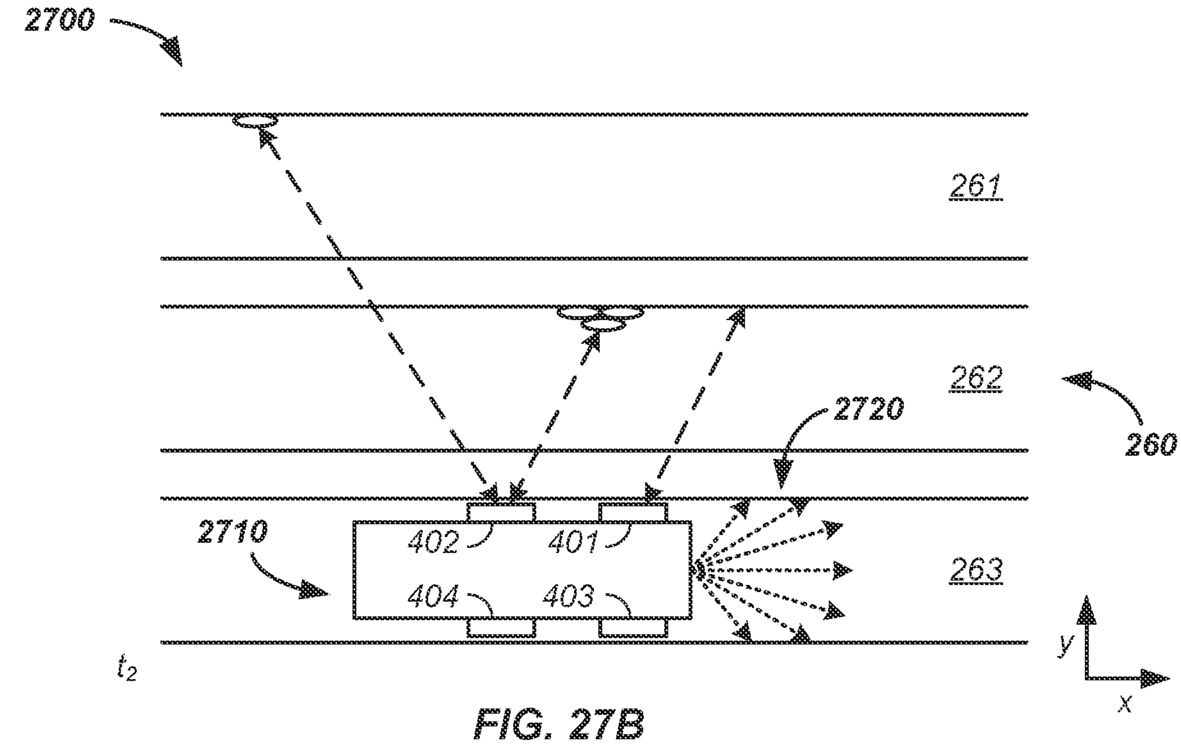

Still referring to FIG. 27A and referring now to FIG. 27B, the ultrasonic sensors on the blasting lance are optionally used to sense imperfections in adjacent pipes. In a first case, the ultrasonic sensors are observing a missed build-up of material in a recently cleaned pipe, such as the first heat exchange pipe 261. The combination of sensors, such as on the side of the first heat exchange pipe 261, are used to localize the missed build-up of material. Logically, the sensors are then connected to a controller/computer that redirects the blasting lance 2710 to the first heat exchange pipe 261 for a follow up cleaning of the missed build-up. Similarly, in a second case, the ultrasonic sensors are observing a build-up of material in a not recently cleaned pipe, such as the third heat exchange pipe 263, not cleaned within the last week, month, or year. The combination of sensors, such as on the side of the third heat exchange pipe 261, are used to localize the not yet cleaned build-up of material. Logically, the sensors are then connected to a controller/computer that directs the blasting lance 2710 to spend extra time cleaning the third heat exchange pipe 263 at the not yet cleaned build-up material site.

Example I

Figure 28A:
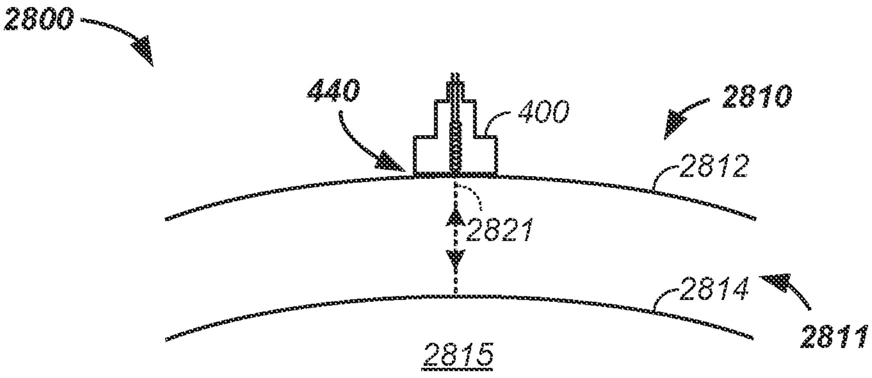
FIG. 28A illustrates a process of measuring a proximate and distal wall of a pipe and FIG. 28B illustrates signals from a proximate and distal wall of a pipe.
Figure 28B:
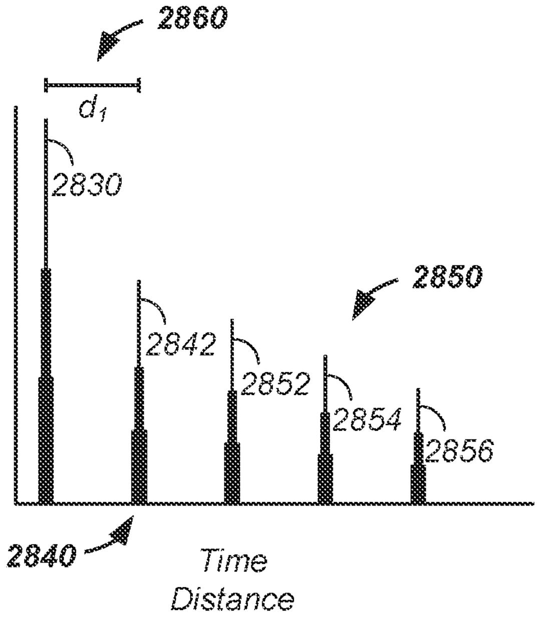

Referring now to FIG. 28A, an example of the ultrasonic sensor 400 is further described in terms of interaction 2800 with an incident wall 2811 of a tube 2810/pipe, such as any of the pipes of the heat exchanger 200. More particularly, an exemplary single pulse is illustrated from the ultrasonic sensor 400, though in practice multiple pulses are sent into the tube 2810, such as at ultrasonic frequencies in a chirp, described supra. Referring now to FIG. 28A and FIG. 28B, as illustrated, an ultrasonic pulse or transmitter pulse 2830, generated by the ultrasonic sensor 400, generates the force wave 405, where the pulse is optionally coupled to the tube 2810 with a coupling fluid 440. A first path 2821 of the pulse passes through a first outer surface 2812 of the incident wall or proximate wall 2811 and at least partially reflects off of a first inner surface 2814 of the proximate wall 2811, such as prior to entering a fluid area 2815 within the tube 2810. Referring now to FIG. 28B, the transmitter pulse 2830 is illustrated at a first time and successive reflections 2850 are illustrated. Particularly, a first reflection 2842, at a first time 2840, $t_1$, is representative of a wall thickness 2860, $d_1$, of the tube 2810 or pipe. Successive reflections 2850, such as a second reflection 2852, a third reflection 2854, and a fourth reflection 2856 are additional measures of the wall thickness 2860, $d_1$. The successive reflections 2850 progressively decrease in magnitude of response and increase in width. The successive reflections 2850 are illustrated here to describe one element of detected signals, where analysis of the detected signal yields information on the state of the tube 2810 or pipe, such as cracks, corrosion, pits, and build-up. For clarity of presentation, successive reflections are not illustrated in subsequent examples, where additional behaviors of the force wave 405 are illustrated.

Example II

Figure 29:
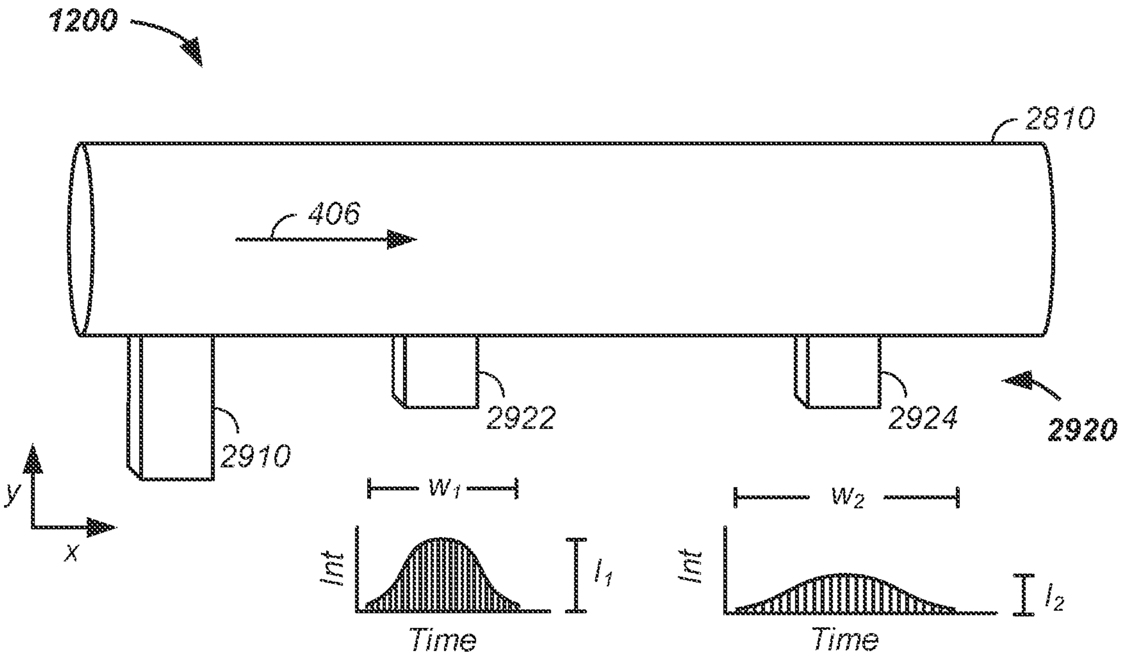
FIG. 29 illustrates change in intensity and width as a function of time.

Referring now to FIG. 29, longitudinal propagation 2900 of the force wave 405 along a length of the pipe 980 is illustrated. Here, a pulse generation section 2910 of the ultrasonic sensor 400 is illustrated with a plurality of pulse detection sections 2920. The pulse generation section 2910 is optionally an example of the transmitting section 422 of the ultrasonic sensor 400. The pulse detection sections 2920, which are also examples of at least the piezoelectric material of the ultrasonic transducer, convert the propagating force wave 405 into an electrical signal, such as via use of the piezoelectric component in the ultrasonic transducer coupled to a detection system. As illustrated, the pulse generation section 2910 generates the ultrasonic pulse, which forms the force wave 405. A second path 406 of the force wave 405 is illustrated along a longitudinal length of the tube 2810. Generally, a first detected signal at a first detector 2922, of the plurality of detection sections 2920, has a first width, $w_1$, and a first intensity, li, and a second detected signal at a second detector 2924, of the plurality of detection sections 2920, has a second width, $w_2$, and a second intensity, $I_2$, where successive detected signals of progressively further removed detectors yield response signals with progressively smaller intensities and progressively wider responses, such as greater than 0.1, 1, 2, or 5% differences from detector element to detector element. Again, the second path 406 of the force wave 405 yielding progressively less intense and wider signal responses are illustrated here to describe another base wave element of detected signals, where analysis of the detected signal yields information on the state of the tube 2810 or any tube element of the heat exchanger 200, such as cracks, corrosion, pits, and build-up. For clarity of presentation, successive reduction in intensity and progressively wider responses of the base force wave are not illustrated in subsequent examples, where additional behavior of the force wave 405 is illustrated. However, it is noted that reflections off of walls, such as in Example I, and progressive changes in the base behavior of ultrasonic pulses, such as in this Example II, are present in each signal and are accounted for in an analysis algorithm, such as an AI model, which optionally and preferably uses reference signals of pipe widths, types, and materials; levels of corrosion; levels of build-up; types of carried fluids, fill levels of transported fluid; and/or types, orientations, and extent (magnitude and/or width) of cracks.

Example III

Figure 30:
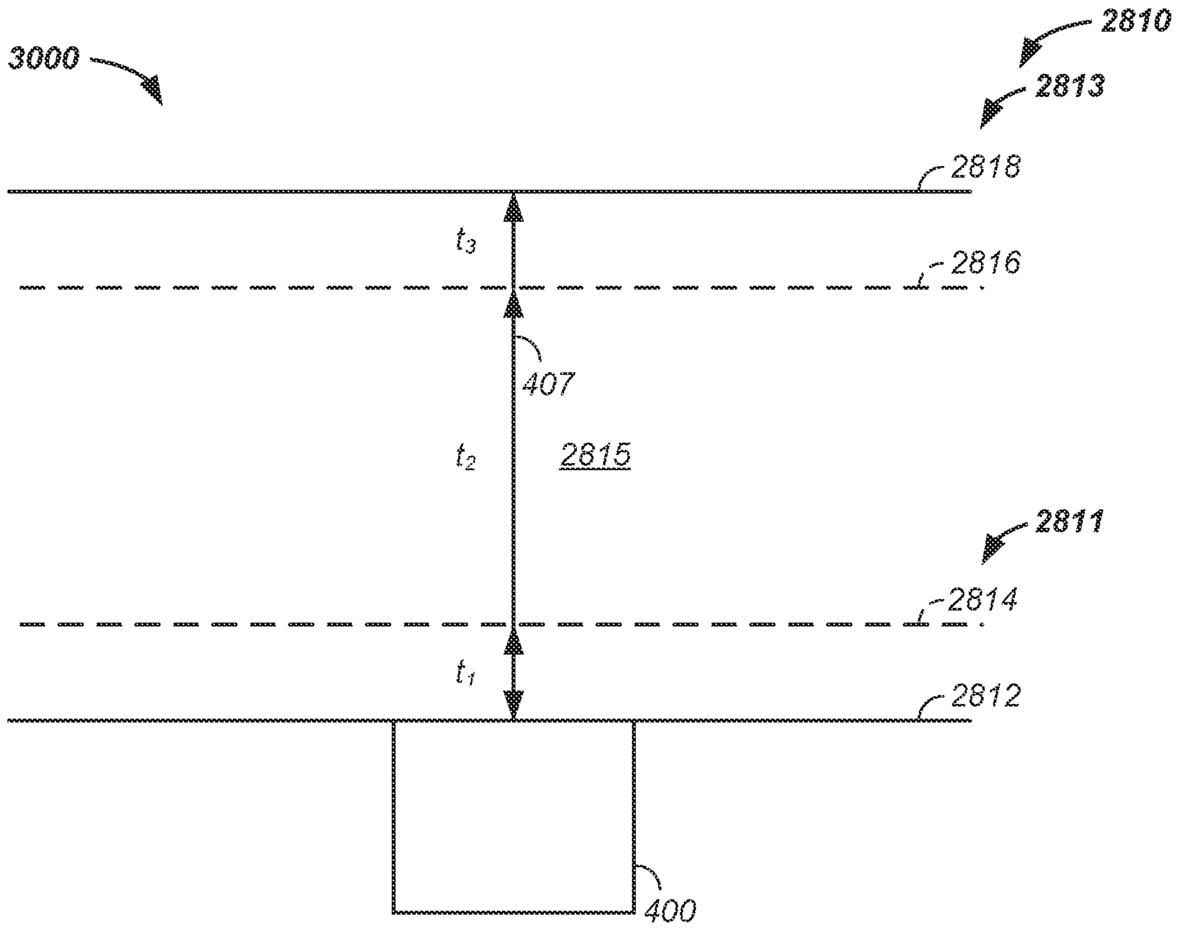
FIG. 30 illustrates monitoring axially across a pipe.
Figure 31:
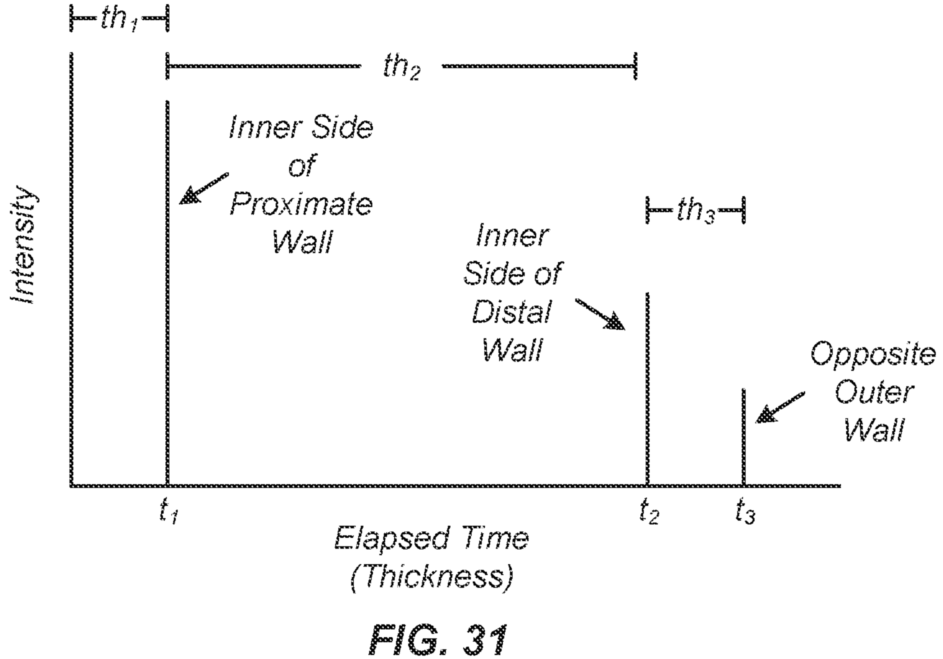
FIG. 31 illustrates measuring proximate and distal wall thicknesses.

Referring now to FIG. 30, full radial pipe reflections 3000 are illustrated, which is an example of a third path 407 of the force wave 405. As illustrated, the force wave 405 is generated by the ultrasonic sensor 400. The force wave 405 travels through a proximate wall 2811 of the tube 2810/pipe at a first time, $t_1$, then through the fluid or fluid area 2815 (or any internal element of the heat exchanger 200) in the tube 2810 at a second time, $t_2$, and then through a distal wall 2813 of the tube 2810, such as through a second inner surface 2816 and off a second outer surface 2818 at a third time, $t_3$. As illustrated, signals from the third path 407 of the force wave 405 are detected using the piezoelectric element 420 of the ultrasonic sensor 400/transducer, where a change in shape of the piezoelectric element 420 induced by the force wave 405 generates a current, which is converted to a voltage and amplified, such as with the use of a standard detection system. Referring now to FIG. 31, the third path 407 yields information on a first thickness, $th_1$, of the proximate wall 2811 of the tube 2810; contents of the pipe in a second thickness, $th_2$, of the tube 2810; and a third thickness, $th_3$, of the distal wall 2813, where deviations from a newly installed pipe yield information on corrosion of the pipe walls and/or build-up of material on the pipe walls, as further described infra. Again, for clarity of presentation, successive reflections off of the proximate wall 2811 and distal wall 2813 of the tube 2810 are not illustrated in subsequent examples, where additional behavior of the force wave 405 is illustrated. However, it is noted that reflections off of walls, such as in Example I; progressive changes in the base behavior of ultrasonic pulses, such as in this Example II; and reflections off of the distal wall 2813 are present in each signal and are accounted for in a model of the tube 2810 and/or elements of the heat exchanger 200, as further described infra.

Corrosion/Build-Up

The three examples, provided supra, yield information on a baseline state of a tube 2810 or any pipe element of the heat exchanger 200. The next few examples show additional paths of the force wave 405 through build-ups and corrosion in the tube/pipe/heat exchanger element. Combined with baseline pathways and baseline expected intensities and widths of successive signals, information on the build-ups and corrosion within the pipe is derived, as further described herein.

Example IV

Figure 32:
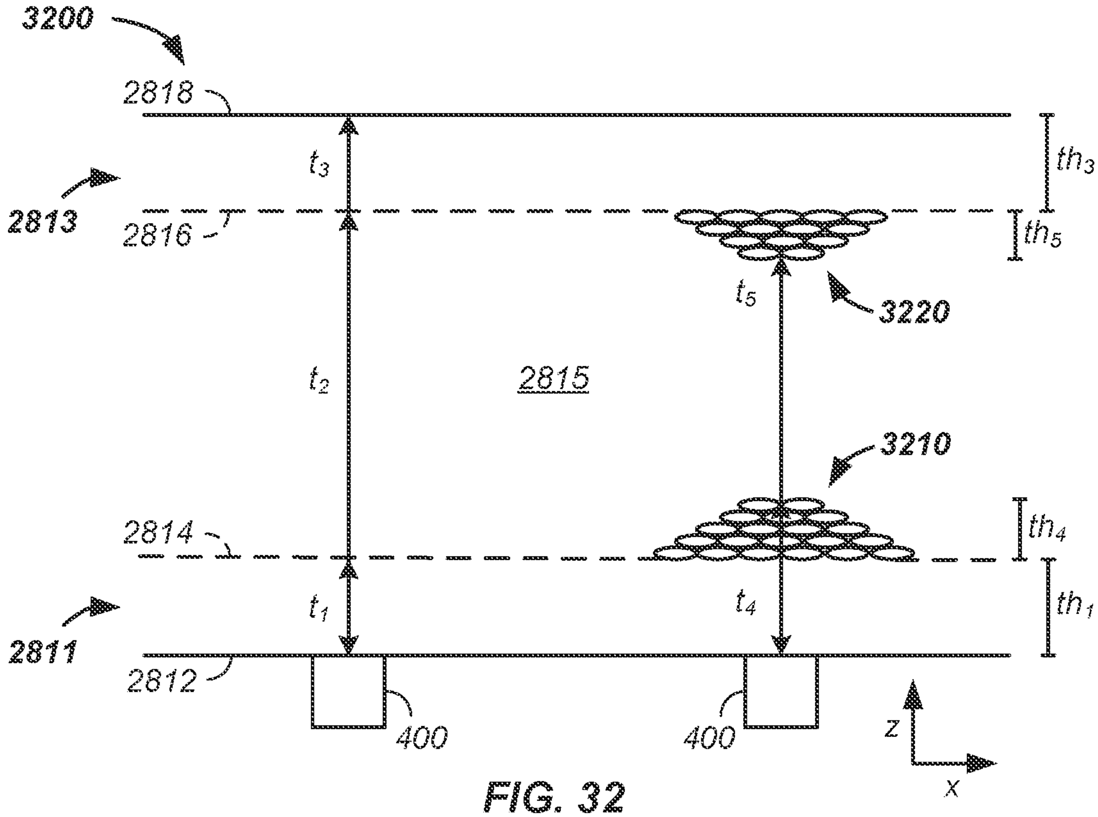
FIG. 32 illustrates a process of monitoring build-up in a pipe.
Figure 33:
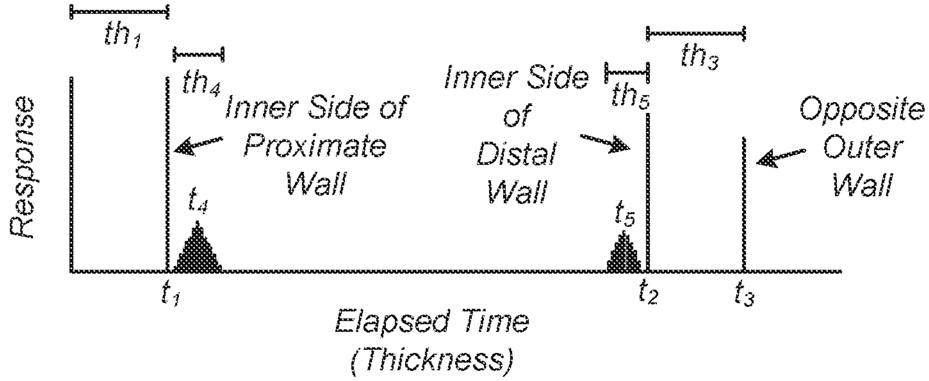
FIG. 33 illustrates signals from build-up in a pipe.

Referring now to FIG. 32, partial pipe clogging/build-up 3200 is illustrated. As illustrated in the left side of FIG. 32, initial times and corresponding expected signals of a transducer signal through a clean pipe are illustrated, such as in Example III. However, build-up of material in the fluid area 2815 of the tube 2810 is illustrated on the right hand side of FIG. 32. Particularly, a first build-up 3210, such as on a bottom portion of the fluid area 2815 results in a fourth signal at a fourth time. More particularly, a first signal representative of an intact proximate wall 2881 is illustrated in FIG. 33 showing a non-corroded proximate wall 2811 as the first thickness, $th_1$, at a first time, $t_1$, matches as reference signal of an intact proximate wall, such as in Example III. However, the first build-up 3210 results in new additional reflections of the force wave 405 at a fourth time, $t_4$, which is a measure of a fourth thickness, $th_4$, of the first build-up. Similarly, a second build-up 3220 on the top of the inner fluid area 2815 results in another set of reflections of the force wave 405 at a fifth time, $t_5$, representative of a fifth thickness, $th_5$, of a build-up on the opposite wall of the tube 2810. Said again, the added signals at the fourth time and fifth time relative to a clean pipe set of signals, with reflections at the first, second, and third times, provides information on build-ups on different inner surfaces of the tube 2810 and the width of the fourth time signals and fifth time signals is indicative of the extent (depth) of the build-ups.

Example V

Figure 34:
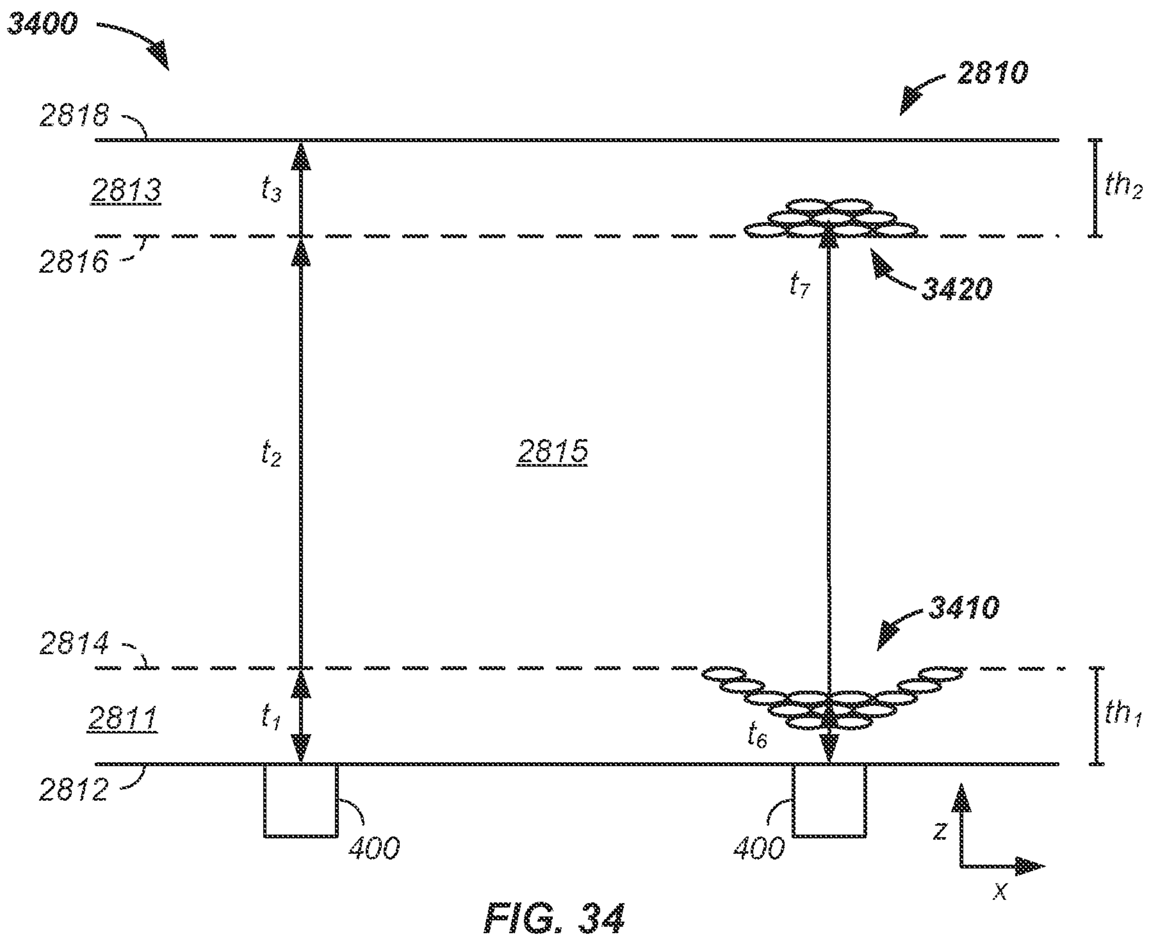
FIG. 34 illustrates a process of monitoring corrosion in a pipe.
Figure 35:
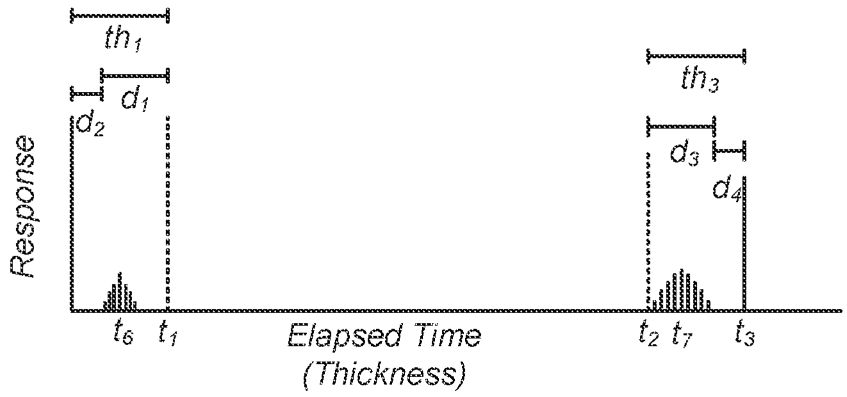
FIG. 35 illustrates signals from corrosion in a pipe.

Referring now to FIG. 34, partial pipe corrosion 3400 is illustrated. Similar to the previous example, a first, second, and third time, on the left of FIG. 34, represent ultrasonic pathways in an uncorroded pipe. On the right side of FIG. 34, first corrosion 3410 is illustrated on a proximate side of the tube 2810/pipe relative to the ultrasonic sensor 400. At a sixth time, the force wave 405 is at least partially reflected by the first corrosion 3410. Referring now to FIG. 35, the sixth time of a response, indicative of corrosion, versus the above described first time, indicative of a thickness of the proximate wall 2811 reveals the thickness of the corrosion, $d_1$, and a thickness of the remaining intact wall, $d_2$, which add up to the first thickness, $th_1$, of the original proximate wall 2811. Similarly, referring again to FIG. 34, second corrosion 3420 in the distal wall 2813 yields a seventh time signal, $t_7$. Referring again to FIG. 35, the seventh time signal, $t_7$, yields a measure of a distal wall corrosion thickness, $d_3$, and a remaining distal wall thickness, $d_4$, which add up to an original thickness, $th_3$, of the distal wall 2813.

Example VI

Figure 36A:
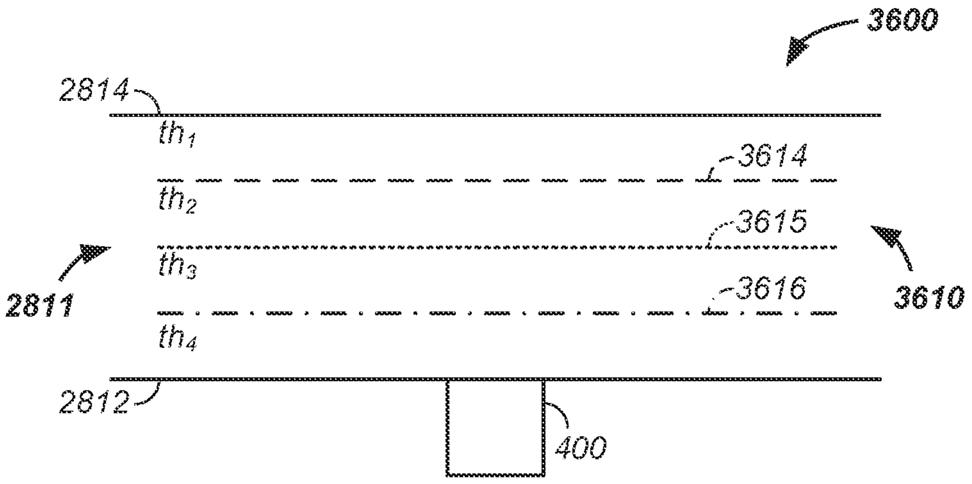
FIG. 36A illustrates calibration.
Figure 36B:
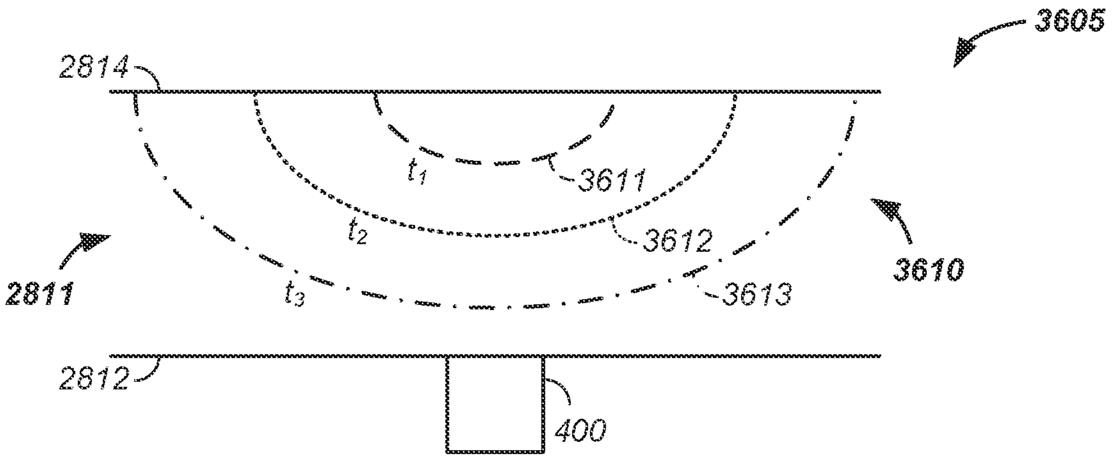
FIG. 36B illustrates corrosion.
Figure 36C:
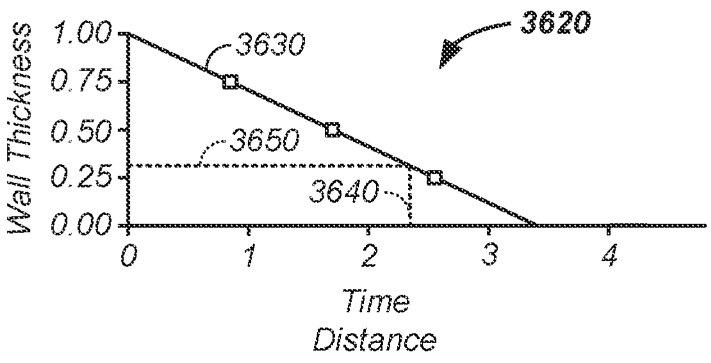
FIG. 36C illustrates quality control of pipe thickness.

Referring now to FIGS. 36(A-C) measuring corrosion as a function of time is illustrated. Referring now to FIG. 36A, a controlled thickness pipe 3600 is illustrated with various thicknesses 3610, such as an initial thickness, $th_1$; a first reduced thickness 3614, $th_2$, such as after machining; a second reduced thickness 3615, $th_3$; and a third reduced thickness 3616, $th_4$. Essentially, the ultrasonic sensor 400 makes measurements on each pipe wall thickness and a calibration plot is generated, which is illustrated in FIG. 36C, specifically with the open squares. Referring now to FIG. 36B, corrosion in the proximate pipe wall is illustrated with a first corrosion 3611 at a first time, $t_1$; a second corrosion 3612 at a second time, $t_2$; and a third corrosion 3613 at a third time, $t_3$, as measured by the ultrasonic sensor 400. In practice, when the ultrasonic sensor 400 measures an indicator time 3640 corresponding to a threshold wall thickness 3650, maintenance on the pipe is triggered, such as repairing the corrosion 3605 or more likely replacing or plugging the pipe. Essentially, the calibrated ultrasonic transducer signal indicates, before pipe failure, when and where to perform maintenance on one or more pipes.

Example VII

Figure 37:
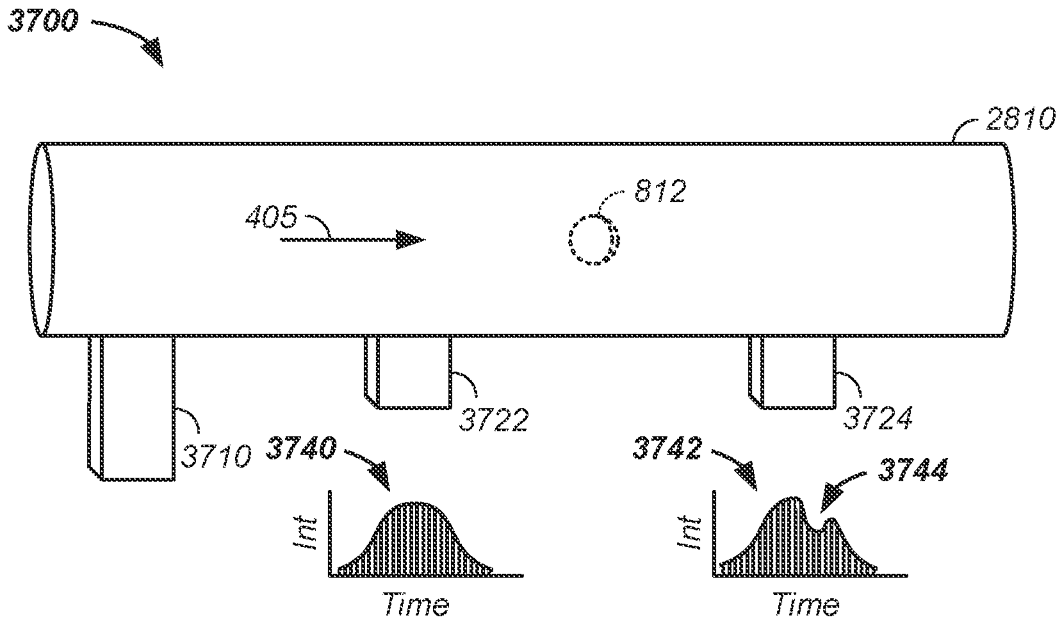
FIG. 37 illustrates monitoring an absorbance of a signal due to an imperfection.

Referring now to FIG. 37, fault detection 3700 in the tube 2810, such as any pipe of the heat exchanger 200, is illustrated. The ultrasonic sensor 400/ultrasonic transducer is optionally and preferably used to isolate a region of a fault, such as a crack, pit, corrosion, and/or build-up. A pulse generation section 3710 generates the ultrasonic pulse, which forms the force wave 405. As described, supra, a calibration is performed and the intensity and width decrease and widen, respectively, in a known manner in a new pipe, such as in a fresh pipe signal 3740. In the field, the tube 2810 develops imperfections, such as a crack 814 or imperfection 812. Referring again to FIG. 37, as the force wave 405 passes through the imperfection 812, representative here of any crack, build-up, or corrosion, the force wave 405 is altered to form a used pipe signal 3742, such as where particular alterations, patterns, or absorbances 3744 of the force wave 405 are observed. Here, since the absorbances 3744 are observed after the first detector 3722 and prior to the second detector 3724, maintenance is alerted to a fault in the tube 400/pipe between the first detector 3722 and the second detector 3724. Generally, any number of detectors are used, such as greater than 1, 2, 4, 10, 25, 50, 100, or 1000 along the pipe. Further, with a library of reference absorbance types, the absorbance 3744 is indicative of the type of fault, as further described infra.

Example VIII

Figure 38:
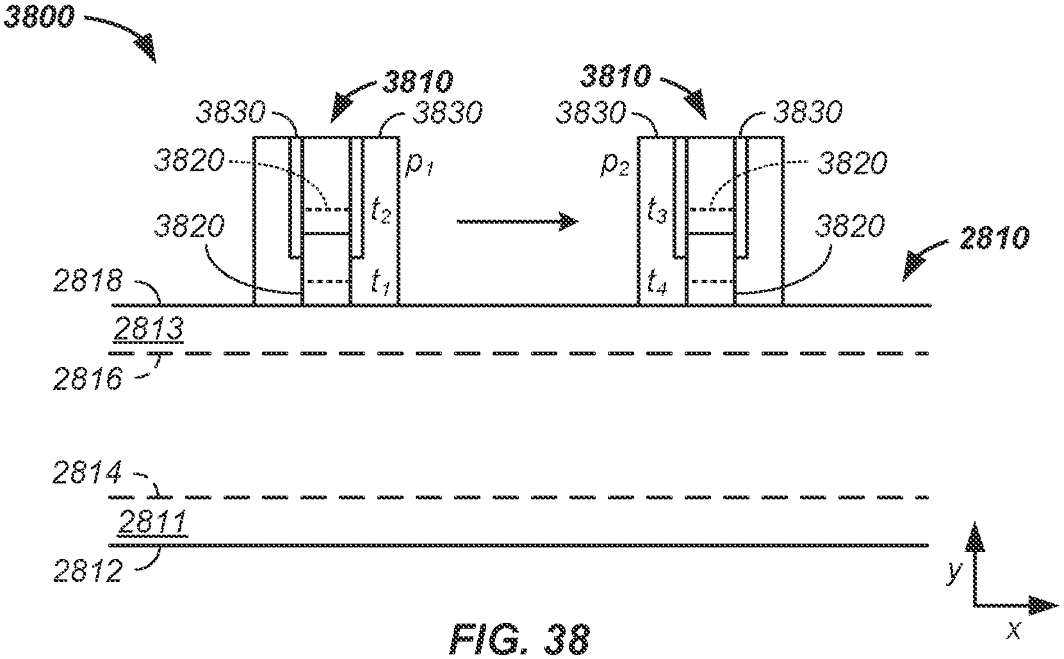
FIG. 38 illustrates a translatable ultrasonic sensor.

Referring now to FIG. 38, a moveable ultrasonic transducer 3800 is illustrated. Essentially, the moveable ultrasonic transducer 3820, a form of the ultrasonic sensor 400/transducer, is optionally used at a first position, $p_1$, on the tube 2810 and is then translated with a translator 3810, such as along a length of the tube 2810, and is subsequently used again, the process repeating any number of times. In one particular embodiment presented for clarity and presentation and without loss of generality, the ultrasonic transducer is positioned on the pipe at a first time, $t_1$; is subsequently translated radially away from the tube 2810 at a second time, $t_2$; is translated in a carrier 3830 along at least a section of the tube 2810 to a second position, $p_2$; where the moveable ultrasonic transducer is lowered after a third time, $t_3$, to a second contact position with the pipe at a fourth time, $t_4$. Generally, any form of carrier is used to reposition ultrasonic transducer, such as along an x-axis of the tube 2810.

Example IX

Figure 39:
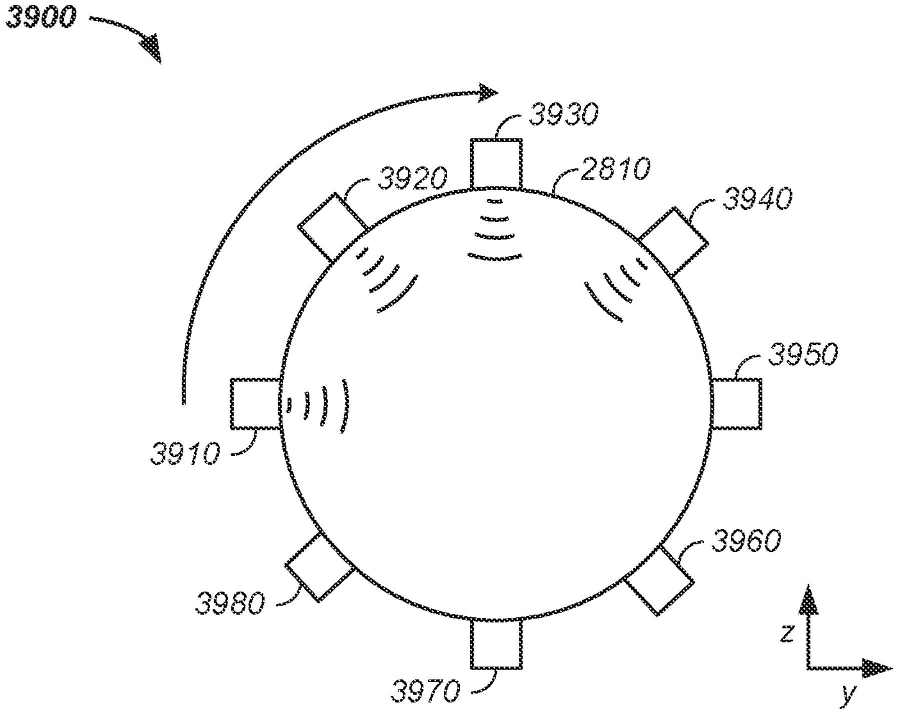
FIG. 39 illustrates rotation of an ultrasonic circumferentially around a pipe.

Referring now to FIG. 39, the ultrasonic sensor 400 is optionally rotated around the tube 2810 to take readings from different radial positions, which yields more precise information on state of the tube 2810. As illustrated, the ultrasonic sensor 400 is rotated into eight positions: a first position 3910, a second position 3920, a third position 3930, a fourth position 3940, a fifth position 3950, a sixth position 3960, a seventh position 3970, and an eighth position 3980 of any number of possible rotation around the tube 2810 positions. As a reading from the ultrasonic sensor 400 also generates information from the distal wall 2813, optionally and preferably the ultrasonic sensor 400 is rotated through an angle of 180 degrees, or less, around a central point in the tube 2810 to achieve a reading of all sections of a pipe circumferentially surrounding the tube/pipe center.

Example X

Figure 40A:
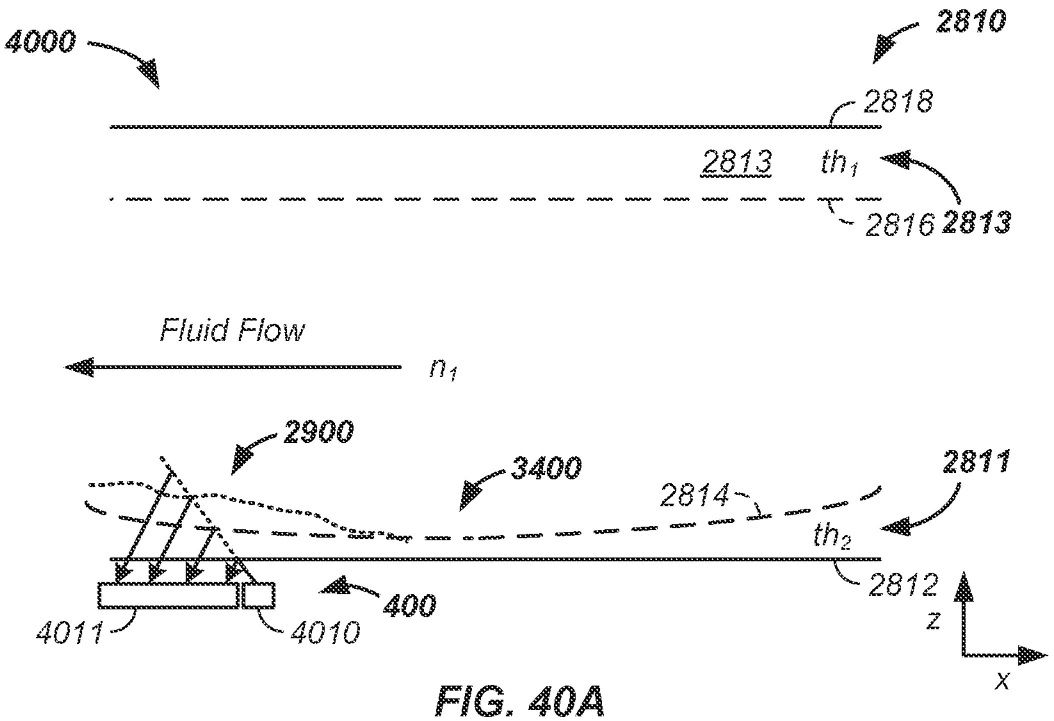
FIG. 40A and FIG. 40B illustrate a sensor array and an array of sensors on a pipe, respectively.
Figure 40B:
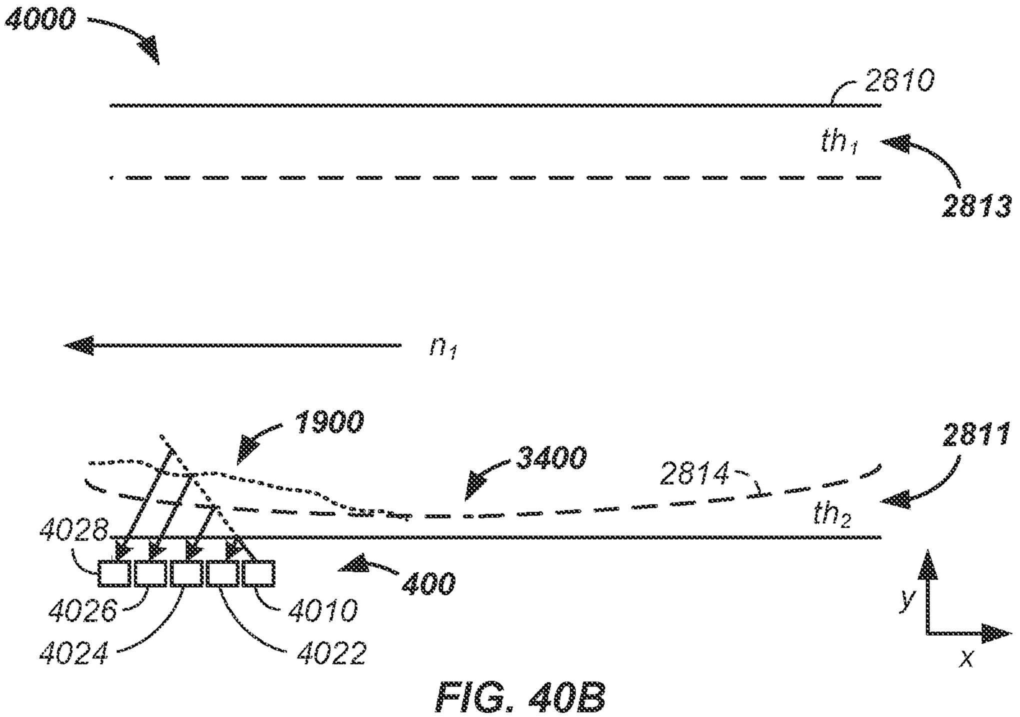

Referring now to FIG. 40A and FIG. 40B, transducer detector arrays are illustrated, which allow further precision in location of a crack, deformation, build-up, and/or corrosion in the tube 2810. As illustrated, the transducer 400 is illustrated with a pulse generation section 3710 and an array of detectors 4011 in FIG. 40A or similarly with a set of detectors in FIG. 40B, such as a first force/deformation detector 4022, a second force detector 4024, a third force detector 4026, and a fourth force detector 4028 of n force detectors, where n is a position integer greater than 1, 2, 5, 10, 50, or 100. The array of detectors allows for a localized extent of the build-up 1900 and/or corrosion 3400 to be measured, such as within less than 1, 2, 4, 6, 12, 24, 36, 72, or 144 inches. Optionally, the pulse generation section 4010 is an array of sources at different spatial positions and/or an array of sources where a common source and/or differing sources use differing wavelengths, energies, frequencies, and/or powers, such as at frequencies exceeding and/or less than 20, 30, 40, 50, 100, 500, 1000, 5000, 10,000, 100,000, or 1,000,000 kHz; at wavelengths less than 1.9 cm; and/or at imaging frequencies.

Still referring to FIG. 40A, the pipe state determination/state determination system is optionally used to measure fluid flow, the fluid in the pipe, an index of refraction, $n_1$, of the fluid, corrosion of the wall of the pipe, such as diminishing from a first thickness, $th_1$, to a second thickness, $th_2$, and/or build-up of material in the tube 2810, such as measure with a third thickness, $th_3$. Similarly, a known density and/or index of refraction of the fluid is optionally used in a calculation and/or an imaging of the wall thickness.

Model

Figure 41:
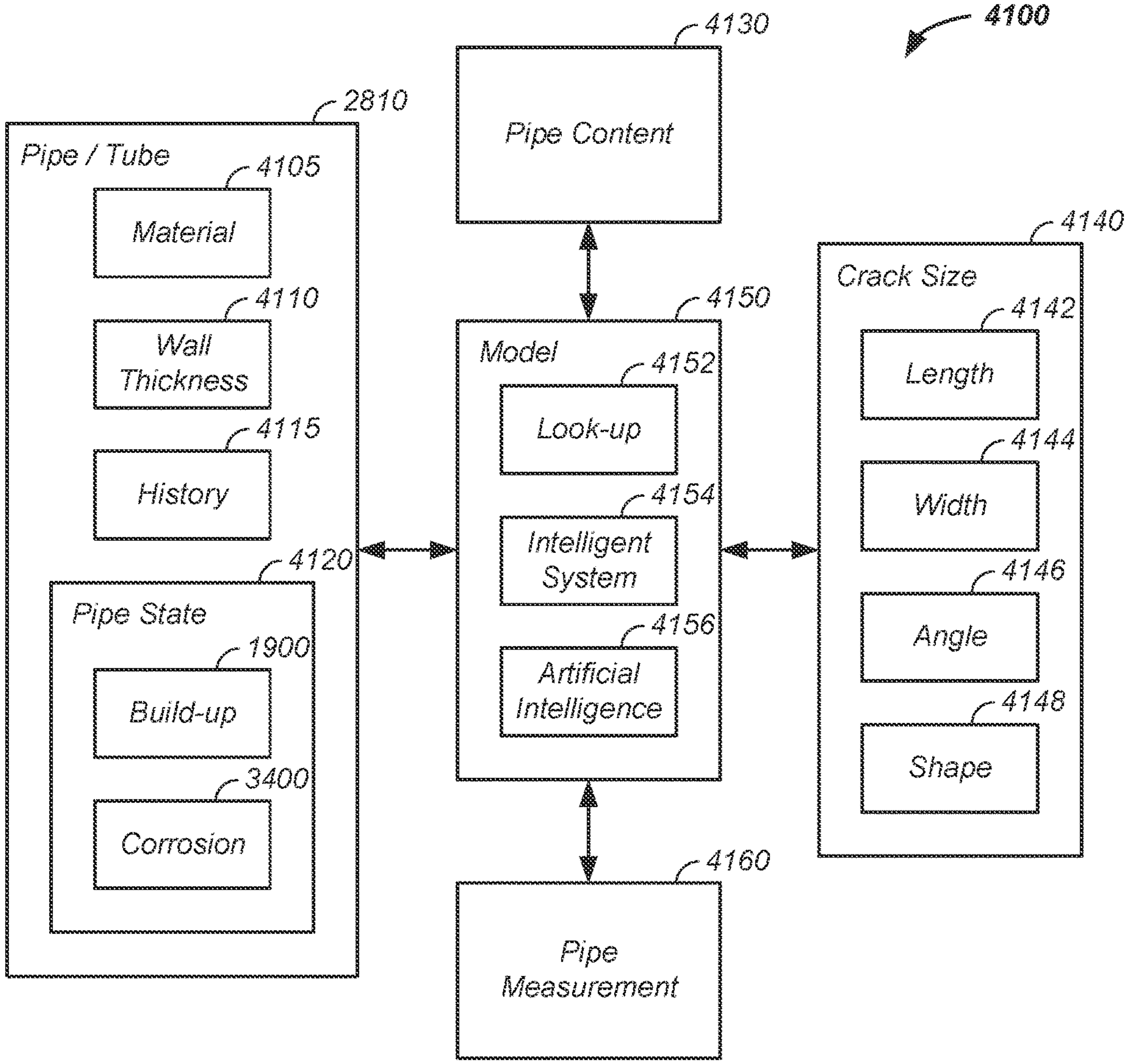
FIG. 41 illustrates development and/or use of a heat extraction pipe state monitoring model.

Referring now to FIG. 41, the model training is further described. For instance, the AI model is calibrated/trains and/or uses a model 4150 of how features affect a force wave 405 generated with the ultrasonic transducer 400 or similar pipe sensor. Several examples of training and/or use of the model 4150 are presented for clarity of presentation and without loss of generality.

Example I

Still referring to FIG. 41, calibration signals of the force wave 405 propagating through the tube 2810/portion of the heat exchanger 200 are optionally and preferably generated that represent a range of real-world states of the heat exchanger 200 or tubes therein. For instance, force waves 405 are generated and tested for tubes 2810 constructed with different materials 4105 to build a calibration set and/or a set of reference signals. Similarly, force waves 405 are generated and tested for pipes having different wall thicknesses 4110 and/or histories 4115, such as at varying ages of similar use. Further, force waves 405 are generated and tested in pipes having known states 4120, such as varying states of build-up 1900 and/or corrosion 3400. Subsequently, when a tube 2810 is tested, such as in the field, a pipe measurement 4160 is compared with the calibration set and/or reference signals and a condition of the pipe is estimated, such as a current pipe state 4120, such as a measured amount of build-up 1900 and/or corrosion 3400.

Example II

Still referring to FIG. 41, in this second example, calibration signals of the force wave 405 propagating through the tube 2810 are again optionally and preferably generated that represent a range of real-world states of the tube 2810; in this case covering pipe content 4130. Content of a pipe 4130 affects the force waves 405 either via direct attenuation, via an attenuated total reflectance, by density, and/or index of refraction. Hence, again, reference signals of how differing pipe contents 4130 affect the force waves 405 are generated in a reference and/or calibration data set and, in a manner similar to the first example, subsequent pipe measurements 4160 are made and corresponding pipe content 4130 predictions are made. For instance, amounts of two component mixtures are made, such as an amount of water in an oil line and/or a first amount of a first grade/type of oil versus and a second amount of a second grade/type of oil currently in the tube 2810, such as at a given measured position and/or length of the tube 2810 or portion of the heat exchanger 200. Fill level of the tube 2810 with any fluid is optionally similarly calibrated and used as a prediction measure.

Example III

Still referring to FIG. 41, in this third example, calibration signals of the force wave 405 propagating through the tube 2810 are again optionally and preferably generated that represent a range of real-world states of the tube 2810; in this case covering one or more pipe imperfections, such as pitting and/or crack size 4140. Generally, reference pipes are constructed and/or found and tested with known lengths 4142 of a crack, known widths 4144 of a crack, known angles 4146 of the crack relative to an incident path of the force wave, and/or known geometric shapes 4148 of cracks. Again, when subsequent pipe measurements 4160 are made, the model 4150 generates an estimated pipe state 4120, such as an estimated length, width, angle, and/or geometry of a crack along with an estimated position.

Example IV

Still referring to FIG. 41, generally the model 4150 is built with one or more reference signals, such as any parameter described herein such as multiple reflectances from a surface, degradation of intensity with length, increased response width as function of propagation distance, from any set of angles, from an array of detectors, and/or from any parameter illustrated in FIG. 41, such as: the tube 2810, any element of the heat exchanger 200, pipe content 4130, and crack size 4140. Subsequently, the model 4150 is used to estimate state of the tube 2810 and/or a pipe content 4130 using the model 4150 operating on a pipe measurement 4160. The model 4150 is optionally any one of or a blend of a calibration, a look-up table 4152, an intelligent system 4154, and/or an artificial intelligence system 4156.

Radial Pipe Section Monitoring

Figure 42A:
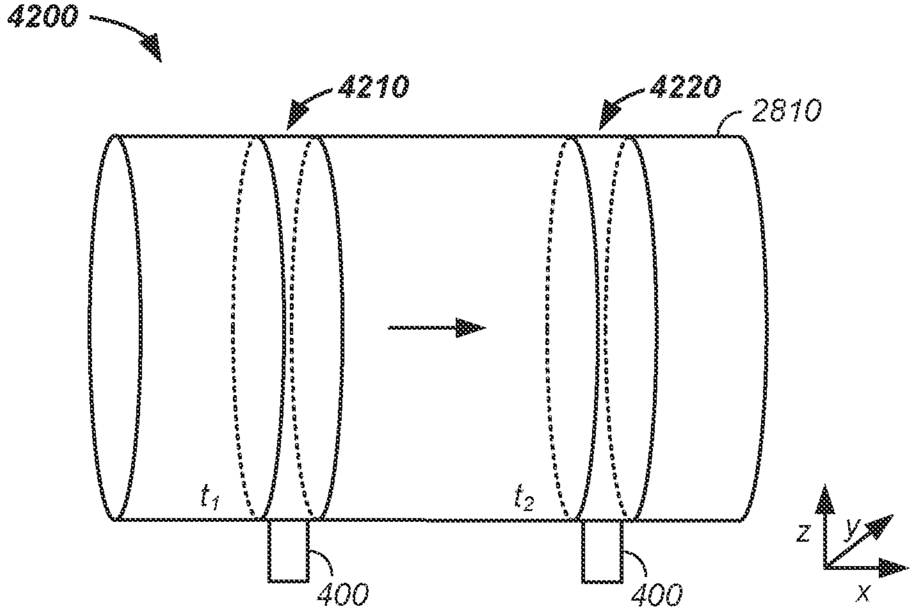
FIG. 42A illustrates monitoring axial cross-sections of a pipe and FIG. 42B illustrates radial and total internal reflectance monitoring of a pipe section.
Figure 42B:
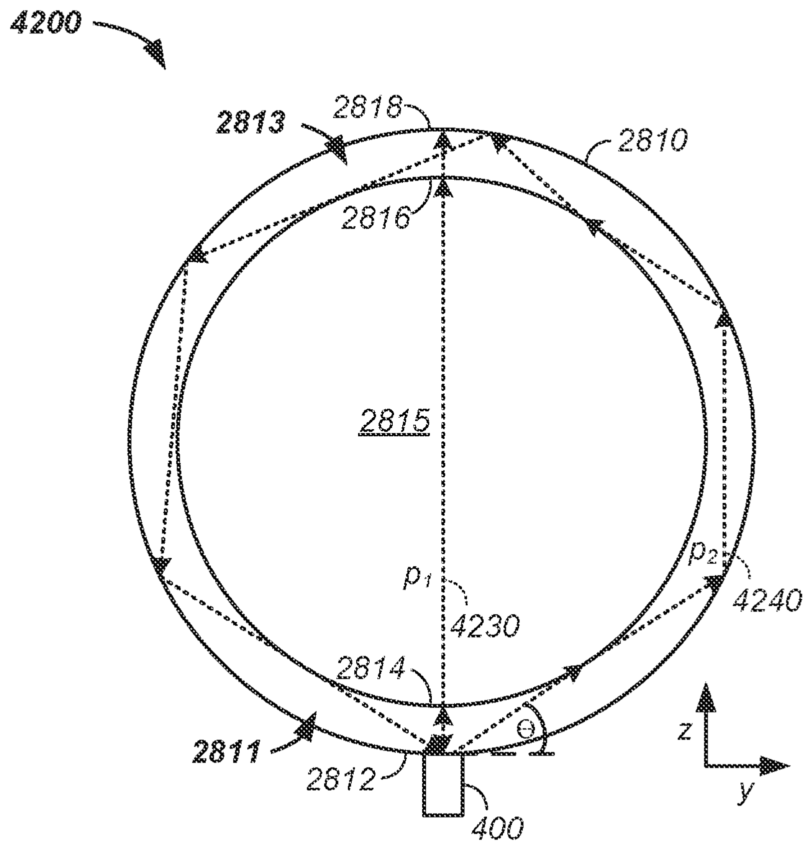

Referring now to FIG. 42A, radial section monitoring 4200 is illustrated. In this example, a first section 4210 of the tube 2810, at a first x-axis position along a length of the tube 2810/pipe section, is monitored at a first time, $t_1$, and optionally and preferably a second section 4220 of the tube 2810 at a second x-axis position along the tube 2810 is monitored at a second time, $t_2$, with the ultrasonic sensor 400. Referring now to FIG. 42B, two measurement types are illustrated. In a first measurement type, the force wave 405 is launched across the pipe in a first path, $p_1$, 4230. As illustrated, the first path passes through the proximate wall 2811, then the fluid area 2815, and then the distal wall 2813 with partial reflections off of the first inner surface 2814, second inner surface 2816, second outer surface 2818, and any build-up, corrosion, or defect in the path, as described supra. As illustrated, the second path, $p_2$, 4240 travels through the pipe wall, such as with a path resembling a fiber optic and/or a path of total internal reflectance. The force wave 405 is launched from the ultrasonic sensor 400 at an angle theta into the proximate wall 2811 of the tube 2810, where theta is an angle relative to a flat surface of the ultrasonic transducer 900 of between 0 and 90 degrees. Again, the second path 4240 interacts with build-up, corrosion, cracks, and/or defects, as described supra. In each measurement type, the ultrasonic sensor 400 is illustrated as functioning as a detector detecting the returned signal. Optionally, a separate pulse generation section and a plurality of pulse detection sections are used, as described supra. Optionally, the force wave 405 is sent along the first path, then then the second path or vice-versa and/or the force wave 405 is simultaneously sent along the first path and second path with response times at four times the radius for the first path and at two times pi time the radius for the second path. By measuring the tube 2810 at a first position with the ultrasonic sensor 400 probing the first path and/or the second path and translating the ultrasonic sensor 900 along a length of the tube 2810, a map of the tube/pipe is optionally and preferably generated, such as a map of build-up, corrosion, cracks, and/or imperfections.

Figure 43:
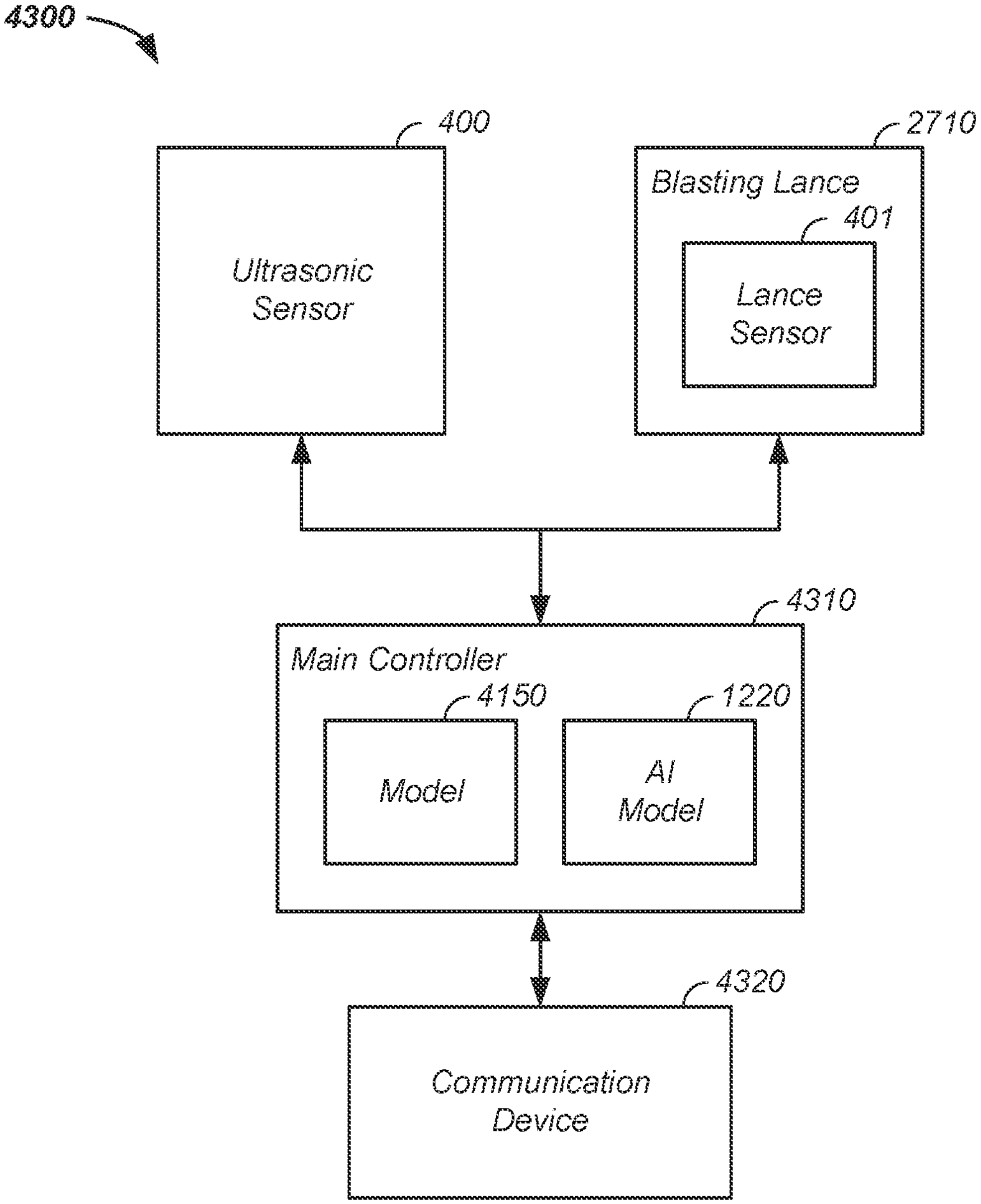
FIG. 43 illustrates a main controller.

Referring now to FIG. 43, main controller communication 4300 is described. Generally, any element described herein is optionally and preferably connected directly and/or indirectly to a main controller 4310, such as a computer system. As illustrated, any of the ultrasonic sensors 400 and/or the blasting lance 2710 and/or any lance sensor 401 attached thereto are optionally and preferably attached to the main controller 4310. The main controller 4310 comprises any computer component along with any hardware for receiving input and/or sending output, such as to any of the ultrasonic sensors 400 and/or any element of the blasting lance 2710 and/or any device configured to move any item described herein. Power for the main controller 4310, ultrasonic sensor 400, and/or blasting lance 2710 is from any one or more power sources. The communication device 4320 includes any device used by a human controller, such as screen, printer, mouse, wireless communication, voice input, and the like.

Optionally, any of the sensors described herein are used to gather information at a first time and one or more subsequent times, such as for use in a time differential measurement.

Optionally, one or more of the ultrasonic sources described herein are configured as ultrasonic cleaners.

Optionally, one or more of any of the sensors describe herein are X-ray sensors.

Still yet another embodiment includes any combination and/or permutation of any of the elements described herein.

Herein, any number, such as 1, 2, 3, 4, 5, is optionally more than the number, less than the number, or within 1, 2, 5, 10, 20, or 50 percent of the number.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/or physical couplings between the various elements. Many alternative or additional functional relationships or physical connections may be present in a practical system.

In the foregoing description, the invention has been described with reference to specific exemplary embodiments; however, it will be appreciated that various modifications and changes may be made without departing from the scope of the present invention as set forth herein. The description and figures are to be regarded in an illustrative manner, rather than a restrictive one and all such modifications are intended to be included within the scope of the present invention. Accordingly, the scope of the invention should be determined by the generic embodiments described herein and their legal equivalents rather than by merely the specific examples described above. For example, the steps recited in any method or process embodiment may be executed in any order and are not limited to the explicit order presented in the specific examples. Additionally, the components and/or elements recited in any apparatus embodiment may be assembled or otherwise operationally configured in a variety of permutations to produce substantially the same result as the present invention and are accordingly not limited to the specific configuration recited in the specific examples.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

Although the invention has been described herein with reference to certain preferred embodiments, one skilled in the art will readily appreciate that other applications may be substituted for those set forth herein without departing from the spirit and scope of the present invention. Accordingly, the invention should only be limited by the Claims included below.

The invention claimed is:

1. A method for sensing state, comprising the steps of:

providing a heat exchanger, said heat exchanger comprising a set of heat exchange pipes at least partially inserted into a housing of said heat exchanger;

providing a heat exchange state model;

detecting first signals passing through a first portion of said heat exchanger with a first ultrasonic sensor;

detecting second signals passing through a second portion of said heat exchanger with a second ultrasonic sensor; and at least one of the steps of:

training said heat exchange state model with said first signals and said second signals;

receiving output from said heat exchange state model, said heat exchanger state model previously trained with said first signals and said second signals;

mounting said first ultrasonic sensor in contact with a first pipe of said set of heat exchange pipes; and mounting said second ultrasonic sensor in contact with a second pipe of said set of heat exchange pipes.

2. The method of claim 1, further comprising the steps of:

mounting said first ultrasonic sensor in contact with said heat exchanger at a first location; and mounting said second ultrasonic sensor in contact with said heat exchanger at a second location.

3. The method of claim 2, further comprising the step of:

receiving output from said heat exchange model, said heat exchange model having been trained with all of: (1) a pipe with a known thickness; (2) a tube with a known build-up of material with said tube; and (3) a known crack state in terms of at least one of a thickness of said crack and a length of said crack.

4. The method of claim 3, further comprising the step of:

detecting, while no ultrasonic sensor of said set of ultrasonic sensors is affixed to a third pipe of said set of heat exchange pipes, a location of a fault in said third pipe, said location comprising at least one of:

a crack;

a build-up of material; and corrosion in a wall of said first pipe.

5. The method of claim 2, further comprising the step of:

receiving output from said heat exchange model, said heat exchange model having been trained with at least one of:

a pipe with a known thickness;

a tube with a known build-up of material with said tube; and a known crack state in terms of at least one of a thickness of said crack and a length of said crack.

6. The method of claim 2, further comprising the step of:

generating a chirp of ultrasonic waves passing into said heat exchanger, the ultrasonic waves at least partially sensed in said first signals.

7. The method of claim 2, further comprising the step of:

receiving output from said heat exchange model, said heat exchange model having been trained with at least one of:

a known geometry with a radius of curvature of a pipe of less than one hundred inches; and a known operational temperature with a temperature variance of less than one hundred degrees from a mean temperature in degrees Celsius.

8. The method of claim 2, further comprising the step of:

moving said first ultrasonic sensor longitudinally along a length of said heat exchanger.

9. The method of claim 8, further comprising the step of:

performing said step of detecting first signals during said step of moving.

10. The method of claim 2, further comprising the step of:

generating a force wave with a first ultrasonic transducer, said force wave interacting with said heat exchanger to yield a first physical interaction, said first signals representative of at least a portion of said first physical interaction.

11. The method of claim 2, said step of receiving output from said heat exchange state model further comprising the step of:

providing said heat exchange model with additional input prior to said step of receiving, said additional input comprising output from at least one of:

a thermometer; and at least two additional ultrasonic sensors.

12. The method of claim 2, said step of receiving output from said heat exchange state model further comprising the step of:

providing said heat exchange model with additional input prior to said step of receiving, said additional input comprising output from at least one of:

a magnetic particle sensor;

an Eddy current sensor;

an X-ray CT sensor;

a radiographic sensor;

a dye penetrant sensor;

an acoustic emission sensor; and a magnetostriction sensor.

13. The method of claim 2, further comprising the step of:

detecting location, in a first pipe of the set of heat exchange pipes, of at least one of:

a crack;

a build-up of material; and corrosion in a wall of said first pipe.

14. The method of claim 1, further comprising the steps of:

mounting said first ultrasonic sensor in contact with said housing at a first location; and mounting said second ultrasonic sensor in contact with a first pipe of said set of heat exchange pipes.

15. The method of claim 14, further comprising the step of:

inserting said ultrasonic sensor at least one inch into an interior passageway of said first pipe.

16. The method of claim 1, further comprising the step of:

mounting said first ultrasonic sensor in contact with said housing at a first location; and mounting said second ultrasonic sensor in contact with said housing at a second location, said first location and said second location separated by a distance of at least one centimeter.

17. The method of claim 1, further comprising the step of:

positioning said first ultrasonic sensor on an inlet end of said first pipe relative to a fluid moving through said first pipe; and positioning said second ultrasonic sensor on an outlet end of said second pipe relative to the fluid moving through said second pipe.

18. The method of claim 1, further comprising the steps of:

inserting a blasting lance into a first pipe of said set of heat exchange pipes, said blasting lance comprising: a front end and a third ultrasonic sensor;

spraying a cleaning fluid forward into said first pipe from a front end of said blasting lance; and emitting a force wave from said first ultrasonic sensor physically and directly connected to said blasting lance.

* * * * *